(12) United States Patent
Lin et al.

(10) Patent No.: US 12,548,459 B1
(45) Date of Patent: Feb. 10, 2026

(54) SYSTEM AND METHOD FOR PREPARING PRACTICE TESTS USING MACHINE LEARNING MODELS

(71) Applicant: Quizlet, Inc., San Francisco, CA (US)

(72) Inventors: Tingting Lin, San Francisco, CA (US); Derrick Bonafilia, Seattle, WA (US)

(73) Assignee: Quizlet, Inc., San Francisco, CA (US)

( * ) Notice: Subject to any disclaimer, the term of this patent is extended or adjusted under 35 U.S.C. 154(b) by 0 days.

(21) Appl. No.: 18/972,582

(22) Filed: Dec. 6, 2024

(51) Int. Cl.
*G09B 7/02* (2006.01)
*G06N 3/0475* (2023.01)
*G06N 3/09* (2023.01)
*G09B 7/06* (2006.01)

(52) U.S. Cl.
CPC ............. *G09B 7/02* (2013.01); *G06N 3/0475* (2023.01); *G06N 3/09* (2023.01); *G09B 7/06* (2013.01)

(58) Field of Classification Search
CPC ... G09B 7/02; G09B 7/06; G06N 3/09; G06B 3/0475
See application file for complete search history.

(56) References Cited

U.S. PATENT DOCUMENTS

| | | | |
|---|---|---|---|
| 2019/0205761 A1* | 7/2019 | Wu | G06F 16/353 |
| 2020/0302296 A1 | 9/2020 | Millar | |
| 2020/0357296 A1 | 11/2020 | Sharma | |
| 2021/0358317 A1* | 11/2021 | Faldu | G06F 18/2185 |
| 2023/0080674 A1* | 3/2023 | Attali | G06F 40/56 |
| 2023/0282132 A1 | 9/2023 | Crouse et al. | |
| 2024/0070565 A1 | 2/2024 | Cohen et al. | |

OTHER PUBLICATIONS

Chen et al (2016). Infogan: Interpretable representation learning by information maximizing generative adversarial nets. Advances in neural information processing systems, 29 (Year: 2016).*

* cited by examiner

*Primary Examiner* — Thomas J Hong
(74) *Attorney, Agent, or Firm* — Baker Botts L.L.P.

(57) ABSTRACT

The computer-implemented method includes obtaining a data input and determining its eligibility using an eligibility model. This eligibility is assessed by identifying the language and subject of the data and confirming whether they fall within a predefined set of acceptable languages and subjects. If eligible, the input is classified as a practice-test-type using a data classification model. Subsequently, a text classification model identifies and classifies a first selection from the practice-test-type input as a candidate question. The candidate question is represented using a first word embedding, while a generative model produces a suggested question based on the candidate question, represented using a second word embedding. A similarity score between these embeddings is calculated, and if it exceeds a selected threshold, the suggested question is selected as the practice test question. Based on the suggested question, the generative model produces a suggested answer. Subsequently, the method includes generating a practice test.

20 Claims, 6 Drawing Sheets

SYSTEM AND METHOD FOR PREPARING PRACTICE TESTS USING MACHINE LEARNING MODELS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. @ 2024 Quizlet, Inc.

TECHNICAL FIELD

One technical field of the present disclosure is computer-implemented systems and methods for generating practice tests using machine learning models. Another technical field is data science using a collection of machine learning models, each trained for specific purposes.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Traditional online learning systems have made targeted instructions for students in a wide variety of subjects and learning modes more accessible than ever before. Outside of traditional educational institutions, diverse groups of users spread across the globe can learn almost anything without ever setting foot in a classroom. While online platforms have made significant advancements in delivering educational content, creating customized assessments and practice tests remains a challenge. Current systems do not have effective software or other technical means to generate tests for computer presentation over networks and often rely on static question banks or require significant manual effort to design tests that align with specific user-provided study materials. This limitation results in a lack of personalized and contextualized test preparation resources for users and requires excessive use of computing resources and storage to draft and revise tests.

In conventional methods, generating practice tests typically involves educators or content creators manually selecting or writing questions and answers. This process can be time-consuming and may not adequately reflect the specific focus of a learner's study material. Consequently, students may practice questions that are either too generic or irrelevant to their particular needs. Moreover, manually crafted tests lack the dynamic adaptability to quickly incorporate new information or adjust to the user's evolving understanding of a subject.

Automated methods have been proposed to address these challenges, but they often involve simple rule-based systems or limited keyword-matching techniques that fail to capture the nuances of complex educational content. These traditional techniques do not generate questions and answers that are contextually appropriate and accurately aligned with the source material. As a result, there is a need for a more sophisticated solution that can automatically generate high-quality practice tests based on user-provided study materials.

Based on the foregoing, the relevant technical fields have developed an acute need for improved techniques for creating customized practice tests.

SUMMARY

The appended claims may serve as a summary of the invention.

DETAILED DESCRIPTION

1. Introduction

1.1 Notes on Scope

Figure 1:
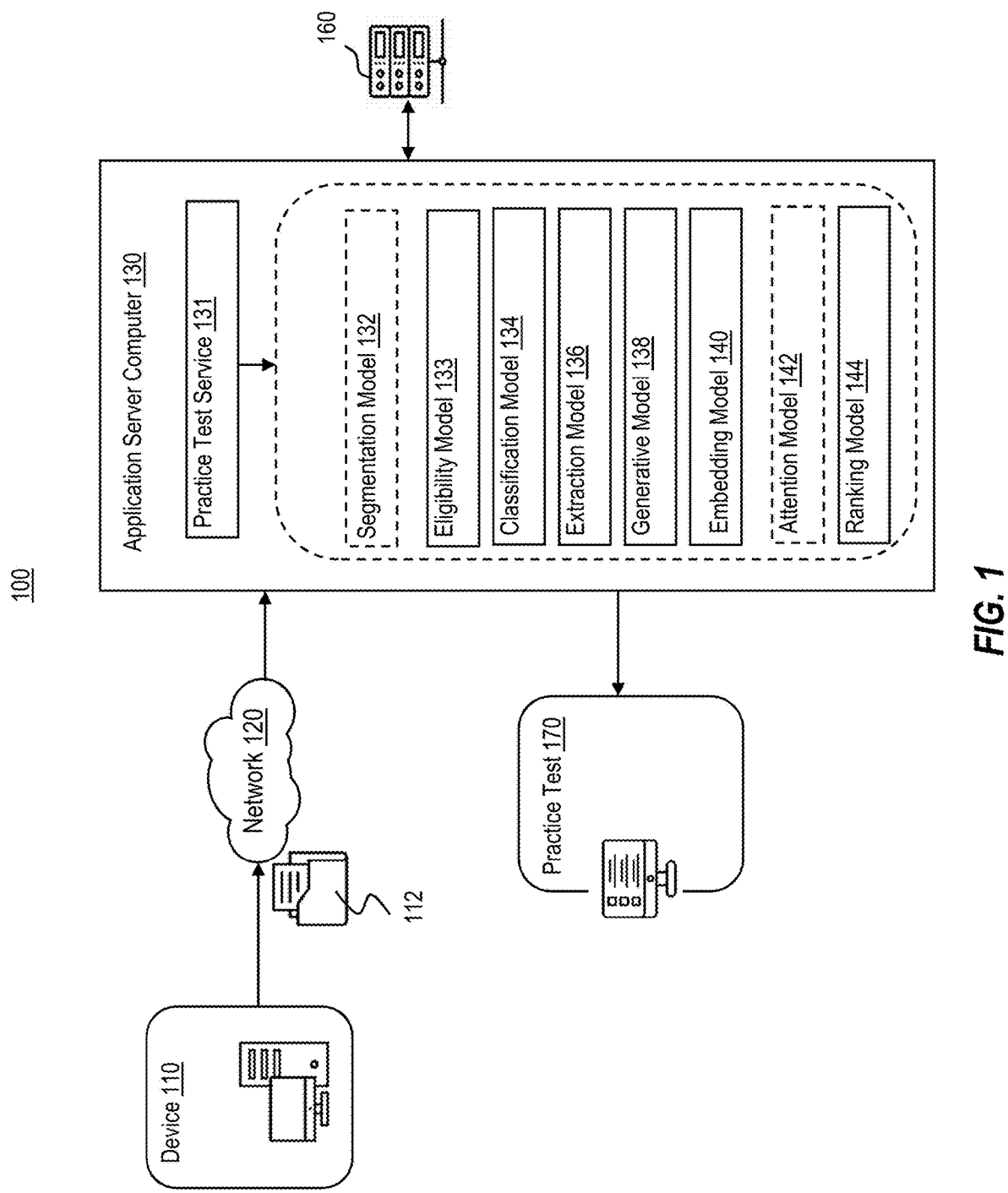
FIG. 1 illustrates an example system environment for generating a practice test according to one or more embodiments.

In the following description, for the purposes of explanation, numerous specific details are set forth to provide a thorough understanding of the present invention. It will be apparent, however, that the present invention may be practiced without these specific details. In other instances, well-known structures and devices are shown in block diagram form to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

One or more different inventions may be described in this disclosure, with alternative embodiments to illustrate examples. Other embodiments may be utilized, and structural, logical, software, electrical, and other changes may be made without departing from the scope of the embodiments that are specifically described. Various modifications and alterations are possible and expected. Some features of one or more of the inventions may be described with reference to one or more embodiments or drawing figures, but such features are not limited to usage in the one or more embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended as limiting the disclosure in any way or as a basis for interpreting the claims. Devices that are described as in communication with each other need not be in continuous communication with each other unless expressly specified otherwise. In addition, devices that communicate with each other may communicate directly or indirectly through one or more intermediaries, logical or physical.

A description of an embodiment with several components in communication with one other does not imply that all such components are required. Optional components may be described to illustrate various possible embodiments and to illustrate one or more aspects of the inventions more fully. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or occurrences, or some steps may be executed more than once in each embodiment or occurrence. When a single device or article is described, more than one device or article may be used in place of a single device or article. Where more than one device or article is described, a single device or article may be used instead of more than one device or article.

The functionality or features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

1.2 Overview of Embodiments

Systems and methods disclosed herein provide a specific technical solution for automatically generating practice tests from various educational content using machine learning models and advanced natural language processing (NLP) techniques. Thus, the systems and methods disclosed herein address the inefficiencies and complexities associated with manually creating practice tests, providing a practical application that saves time and enhances learning experiences.

Traditional practice test creation methods involve significant manual effort and subjectivity, which can lead to inconsistent quality and relevance. Additionally, educators or students may review and organize large amounts of study material to create meaningful questions and answers. The proposed system addresses this problem by automating the extraction, generation, and validation of practice test questions, ensuring that the content is aligned with the source material and tailored to the learning objectives.

Systems and methods disclosed herein utilize text segmentation and contextual embedding analysis to automatically determine questions and answers from provided content. Such questions and answers are then stored in a question/answer (Q/A) bank database and can be used for practice tests.

In one embodiment, a system is configured to receive input data containing material for a practice test. The received input data can then be segmented into distinct sections based on syntactic and semantic analysis, allowing for precise identification of question and answer segments. This segmentation is enhanced by context-aware embeddings, which can capture the nuanced relationships between words and phrases. Using multi-level embeddings (e.g., word-level, sentence-level, and paragraph-level embeddings), the system can accurately differentiate between various text parts, such as questions, answers, and supporting explanations. This detailed segmentation provides a robust foundation for further processing and eliminates ambiguity in content classification.

Once the content is segmented, the system leverages fine-tuned large language models (LLMs) such as BERT, or GPT to classify within segmented content questions and answers, thereby extracting such questions and answers from the content. Alternatively, if it is determined that content contains concepts but does not specifically include questions and answers, the system is configured to generate questions and answers dynamically based on the content. The LLMs are trained on a specialized corpus of educational texts, ensuring that the generated questions maintain high relevance and accuracy. Furthermore, the system incorporates contextual attention mechanisms, allowing it to focus on the most significant parts of the text when generating questions. This dynamic generation process significantly reduces manual effort and produces high-quality questions that are aligned with the intended learning objectives.

Further, in some implementations besides extracting answers from the content the system is also configured to generate answers based on the extracted questions and based on an available corpus of educational text. The system is then configured to perform a similarity comparison between the extracted answers and the generated answers. The comparison uses multi-level embeddings and a cosine similarity measure with attention-based weighting to ensure that the generated answers not only match the extracted content in terms of meaning but also reflect the context in which the questions are posed. This detailed similarity analysis provides a technical improvement over traditional methods, which often lack such fine-grained validation and rely on keyword matching or basic similarity measures.

The system also incorporates a FAISS (Facebook AI Similarity Search) index to efficiently retrieve relevant questions from a large repository of user-generated and system-generated content. The FAISS index is structured to support high-dimensional vector searches using quantization and partitioning techniques, enabling rapid retrieval of semantically similar questions. By combining this retrieval capability with generated questions, the system ensures that the practice test covers relevant topics, further enhancing its educational value.

After generating and retrieving questions, the system applies a multi-step post-processing mechanism. The post-processing includes re-ranking questions using a re-ranking algorithm, such as LambdaMART or a cross-encoder ranking model, to prioritize the most relevant and high-quality questions, as well as associate accurate answers, based on their semantic similarity, contextual alignment, as well as determined difficulty level. Additionally, the post-processing includes using word embeddings and attention-based models to detect and remove duplicate questions and ensure that only accurate answers are retained. This filtering process ensures that the final practice test is cohesive, free from redundancies, and maintains a high standard of quality.

Further, the system is configured to leverage cloud-based storage solutions like BigQuery and Cloud Spanner to store and manage the generated and retrieved question banks. This allows for scalable management of large datasets and seamless integration with other educational platforms. The system's architecture supports asynchronous processing and caching, which improves the response time and reduces computational overhead, making it suitable for large-scale deployments.

The automated creation of practice tests not only saves substantial time for educators and students but also ensures that the content is tailored to individual learning needs and goals. By automating the question generation and validation process using state-of-the-art NLP techniques and machine learning models, the system provides a practical solution that enhances learning efficiency and content relevance. The technical aspects, such as the use of multi-level embeddings, attention-based similarity measurement, and scalable cloud infrastructure, present clear technical improvements over manual or less sophisticated methods, demonstrating a concrete application of the technology.

The disclosure encompasses the subject matter of the following numbered clauses:

1. A computer-implemented method comprising: using a server computer, obtaining a data input from a client computer; identifying a language and a subject associated with the data input; determining that the data input is an eligible test input based on the identified language being part of a predefined set of languages and the identified subject being part of a predefined set of subjects; determining that the eligible test input is a practice-test-type input using a classification model; executing a first inference stage of the classification model over a first selection from the practice-test-type input to generate a first prediction indicating that the first selection comprises a candidate question; transmitting to a generative model a first prompt comprising the first selection to output a suggested question; transmitting, to the generative model, a second prompt comprising the suggested question to output a suggested answer; selecting the suggested question as a practice test question; selecting the suggested answer as a practice test answer; and generating a practice test comprising a digital card, the digital card having a first graphical user element configured to display the practice test question and having a second graphical user element configured to display the practice test answer, wherein each of the classification model and the generative model comprising a trained machine-learning model.

2. The computer-implemented method of clause 1, further comprising: executing an embedding model over the candidate question to output a first word embedding corresponding to the candidate question; executing the embedding model over the suggested question to output a second word embedding corresponding to the suggested question; measuring a similarity between the first word embedding and the second word embedding; and assessing a suitability of the suggested question as the practice test question based on a similarity score being above a first selected threshold.

3. The computer-implemented method of clause 2, further comprising: executing a second inference stage of the classification model over a second selection from the practice-test-type input to generate a second prediction indicating that the second selection comprises a candidate answer; executing the embedding model over the candidate answer to output a third word embedding corresponding to the candidate answer; executing the embedding model over the suggested answer to output a fourth word embedding corresponding to the suggested answer; measuring a similarity between the third word embedding and the fourth word embedding; and assessing a suitability of the suggested answer as the practice test answer based on a similarity score being above a second selected threshold.

4. The computer-implemented method of clause 3, wherein the first selection comprises a plurality of candidate questions.

5. The computer-implemented method of clause 3, wherein the second selection comprises a plurality of candidate answers.

6. The computer-implemented method of clause 3, wherein the first prompt, the second prompt, or a combination thereof further comprises the second selection.

7. The computer-implemented method of clause 1, further comprising segmenting the data input into one or more sections using a segmentation model and determining the eligibility for each section from the one or more sections based on identified language and subject for each section.

8. The computer-implemented method of clause 7, wherein the segmentation model is a rule-based model configured to extract text data from the data input and identify the one or more sections by detecting specific patterns within the text data, wherein the specific patterns include at least one of: beginning and end of paragraphs, beginning and end of lists, text separated by spaces, changes in indentation levels, presence of bullet points or numbered sequences, heading or subheading styles, line breaks or page breaks, quotation marks or block quote indicators, punctuation patterns such as colons or ellipses, variations in sentence length or structure, phrases, or enumerated answer options; and wherein the patterns are used to delimit boundaries between the one or more sections.

9. The computer-implemented method of clause 8, wherein the segmentation model is configured to utilize syntactic and semantic feature extraction techniques to identify logical boundaries between the one or more sections.

10. The computer-implemented method of clause 7, wherein the eligibility model is a large language model configured to determine the language and the subject of each section from the one or more sections.

11. The computer-implemented method of clause 1, wherein the classification model is a large language model trained on a labeled training dataset, the labeled training dataset comprising training text labeled with question-specific labels when corresponding to questions and labeled with answer-specific labels when corresponding to answers.

12. The computer-implemented method of clause 1, wherein the classification model is an Information Maximizing Generative Adversarial Network (Info-GAN) trained on a generated synthetic training dataset.

13. The computer-implemented method of clause 12, wherein the classification model is a foundation model pre-trained on a large-scale language corpus and further fine-tuned on a labeled training dataset, the labeled training dataset selected based on the identified subject of the practice-test-type input.

14. The computer-implemented method of clause 1, wherein the classification model is further configured to handle ambiguous sections for identifying questions and answers of the practice-test-type input by using uncertainty estimation techniques to quantify a confidence level of text classification model's predictions, wherein the uncertainty estimation techniques include at least one of Monte Carlo Dropout or Bayesian Neural Networks, and wherein the ambiguous sections with low confidence scores are flagged.

15. The computer-implemented method of clause 1, further comprising using the classification model to detect contextual shifts between sections for identifying questions and answers, wherein the contextual shifts are detected by analyzing changes in one or more linguistic features.

16. The computer-implemented method of clause 3, wherein the first word embedding comprises a first set of multi-level embeddings and the second word embedding comprises a second set of multi-level embeddings, each set including word-level embeddings for capturing an individual word meaning, sentence-level embeddings for capturing contextual meaning within a sentence, and paragraph-level embeddings for capturing contextual meaning across multiple sentences, and wherein the first and second sets of multi-level embeddings are used to compute the similarity by comparing embeddings at different levels of granularity to identify semantic relationships between the candidate question and the suggested answer.

17. The computer-implemented method of clause 16, wherein the similarity is determined using a cosine similarity.

18. The computer-implemented method of clause 3, further comprising using an attention model to weigh an importance of individual words or phrases within the candidate question and the suggested question, wherein the attention model is configured to assign higher weights to the individual words or the phrases that are contextually significant, and wherein the similarity between the candidate question and the suggested question is calculated based on their respective attention-weighted the first and second word embeddings.

19. The computer-implemented method of clause 3, wherein generating the suggested question comprises: accessing a question-answer database containing a plurality of records corresponding to questions having associated answers, wherein each question in the question-answer database includes an associated question word embedding; measuring a question similarity between the first word embedding and the question word embedding for each question; determining a matching question in the question-answer database for the question, based on the measured question similarity being above a third selected threshold; and selecting a corresponding question to the matching question as the suggested question.

20. The computer-implemented method of clause 3, wherein generating the suggested question comprises: accessing a question-answer database containing a plurality of records corresponding to questions having associated answers, wherein each answer in the question-answer database includes an associated answer word embedding; measuring an answer similarity between the third word embedding and the answer word embedding for each question; determining a matching answer in the question-answer database, based on the measured answer similarity being above a third selected threshold; and selecting a corresponding question to the matching answer as the suggested question.

2. Structural and Functional Overview 2.1 Distributed Computer System Example

FIG. 1 illustrates a system environment 100 depicts interconnected components such as a user device 110 interacting with application server computer 130 via a network 120. Further, application server computer 130 may be communicatively coupled to database 160.

User device 110 can be any suitable device capable of communicating with application server computer 130 via a web interface or other communication methods. Additionally, user device 110 may refer to any device configured to process data and interact with users. Examples of user device 110 include, but are not limited to, a personal computer, desktop computer, workstation, server, laptop, tablet, mobile phone (e.g., smartphone), smart glasses, virtual reality (VR) headset, augmented reality device, internet-of-things (IoT) device, or any other type of suitable computing device. User device 110 may feature a user interface such as a display, microphone, camera, keypad, or other input/output equipment that facilitates user interaction. Furthermore, user device 110 may include a hardware processor, memory, and/or circuitry configured to perform any functions or actions as described in this disclosure. For convenience, user device 110 may be interchangeably referred to as a computing device within the present description.

User device 110 includes a processor in signal communication with a network interface and memory. The memory stores software instructions that, when executed by the processor, enable the device to perform one or more operations as described herein. User device 110 is configured to communicate with other devices and components within system environment 100 via network 120. A user may employ user device 110 to transmit data, such as test-related data, to application server computer 130. Additionally, user device 110 can utilize various types of interfaces to upload study materials, request practice test generation, and receive the resulting practice test content. The interfaces may include web-based applications accessed through a browser, mobile applications, or standalone programs, allowing users to seamlessly interact with the system and manage their practice test content.

The communication between user device 110 and application server computer 130 can occur through a web-based communication interface, such as a standard web browser (e.g., Chrome, Safari, Firefox) or a dedicated web application. The communication interface between user device 110 and application server computer 130 may support various functions, including document uploads, selecting test generation parameters, and viewing or interacting with the generated practice test content. For smartphones and tablets, a mobile application can provide a streamlined and improved interface that supports the same functionalities as the web-based version. Similarly, a standalone desktop program may be used to access the system without needing a browser, offering additional features such as offline access or integration with other software.

The communication interface provided on a webpage or application can dynamically adapt based on the input data 112 received from the user. For example, when a user uploads study materials recognized as text documents, the interface may present options for selecting specific chapters or topics for generating questions. If the uploaded material is in a different format, such as a list of practice questions, the interface can switch to displaying options for verifying and editing the content of those questions or for generating new answers based on them. Similarly, if a user inputs metadata, such as subject or difficulty level, the interface can provide a different set of options, such as selecting the type of questions to generate or configuring the layout of the practice test.

Additionally, the interface can modify its layout and functionalities depending on the type of uploaded content, such as lecture notes, a textbook chapter, or a set of previous exam questions. For example, when lecture notes are uploaded, the interface might enable segmentation options for selecting specific sections to generate targeted questions. In contrast, if a full textbook chapter is uploaded, the interface could offer topic-based options for breaking down the chapter into manageable units to generate comprehensive practice tests. The system could use distinct interface layouts for different types of questions, such as multiple-choice questions, short-answer questions, or descriptive questions, based on the content and user preferences.

The web-based interface can also incorporate context-sensitive changes in response to real-time user inputs or the results of automated content analysis performed by the server. For example, if the user uploads content that the server determines is unsuitable for generating practice questions (e.g., images or unsupported languages), the interface can provide feedback or suggest alternative options, such as requesting additional text input or uploading compatible file types.

The flexibility in interface design disclosed herein enables application server computer 130 to deliver a customized user experience, making it adaptable for a range of devices, user preferences, and varying data inputs. Whether accessed through a mobile application, standalone program, or dynamic webpage, the user interface is configured to integrate with application server computer 130.

Input data 112 can be any data in the form of educational or instructional content provided by the user to the system for the purpose of generating practice tests or other learning materials. It may include various types of documents, files, or multimedia content, such as text, images, or formatted data, and can be presented in multiple formats. Examples of input data 112 include text documents such as study notes, lecture transcripts, textbook excerpts, chapters, articles, and essays, which can be in formats like .txt, .docx, .pdf, or .rtf, containing written content that application server computer 130 can process to extract information and generate practice questions. Input data 112 may also include pre-existing practice tests or lists of questions that the user wants to incorporate into a new practice test or further refine, such as question-and-answer pairs, multiple-choice questions, or fill-in-the-blank questions. In addition, educational content files, such as PowerPoint presentations, spreadsheets, or structured learning materials outlining specific concepts, topics, or learning objectives, can serve as input data.

Moreover, input data 112 can include metadata, such as subject category (e.g., Math, Physics), topic (e.g., Algebra, Calculus), difficulty level, or intended audience (e.g., high school students, college students), which provides additional context for the input content. The input data can also incorporate images and diagrams, such as labeled diagrams, charts, or infographics that support learning. While these visual elements may not be directly used for question generation, they can be referenced or analyzed to enhance the practice test content. Multimedia content like audio files, video recordings, or other multimedia elements containing spoken explanations or visual demonstrations of concepts may also be included. Structured data formats, such as .csv or .json files that outline specific information, like a list of questions with corresponding answers or metadata fields for classification, can also be provided as input data. Furthermore, input data 112 can include URLs or links to online articles, research papers, or external content that the system can access, parse, and use to generate related practice test content. The input data may be submitted by the user through various interfaces, such as web browsers, mobile applications, or standalone software, depending on the capabilities of user device 110.

In various embodiments, user device 110 is configured to communicate with application server computer 130 via network 120. Network 120 may be any suitable type of wireless and/or wired network. Network 120 may be connected to the Internet or public network. Network 120 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., Wi-Fi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. Network 120 may include fiber optics, optical fibers, and the like to implement quantum communication channels. Network 120 may be configured to support TCP/IP, UDP, or functionally equivalent communication protocols.

The application server computer 130 generally comprises a suitable hardware system designed for processing received data and generating a practice test 170. The practice test 170 may consist of a set of questions that can be displayed to the user. These questions may have corresponding answers, which may or may not be shown to the user, depending on the implementation. In some cases, the questions can include various formats, such as fill-in-the-blank, multiple-choice, true/false, matching, or short-answer questions, among others. The answers are designed to correspond accurately to their respective questions.

In certain embodiments, application server computer 130 may be implemented by a cluster of computing devices, such as virtual machines. For example, application server computer 130 may be implemented by a plurality of computing devices using distributed computing and/or cloud computing systems in a network. In certain embodiments, application server computer 130 may be configured to provide services and resources (e.g., data and/or hardware resources as described herein, etc.) to other components and devices.

Application server computer 130 may comprise one or more processors operably coupled with a network interface and a memory. The one or more processors comprise electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The one or more processors may be a programmable logic device, a microcontroller, a microprocessor, or any suitable number and combination of the preceding. The one or more processors are configured to process data and may be implemented in hardware or software. The one or more processors may include an ALU for performing arithmetic and logic operations. The one or more processors may register the supply operands to the ALU and store the results of ALU operations. The one or more processors may further include a control unit that fetches instructions from memory and executes them by directing the coordinated operations of the ALU, registers, and other components. The one or more processors are configured to implement various software instructions to perform the operations of application server computer 130 described herein. In this way, the one or more processors may be a special-purpose computer designed to implement the functions disclosed herein. The one or more processors may be configured to perform one or more operations of any of the methods described in this disclosure.

The network interface of application server computer 130 is configured to enable wired and/or wireless communications. The network interface may be configured to communicate data between application server computer 130 and other devices, systems, or domains. For example, the network interface may comprise an NFC interface, a Bluetooth interface, a Zigbee interface, a Z-Wave interface, a RFID interface, a Wi-Fi interface, a LAN interface, a WAN interface, a MAN interface, a PAN interface, a WPAN interface, a modem, a switch, and/or a router. The one or more processors may be configured to send and receive data using the network interface. The network interface may be configured to use any suitable type of communication protocol.

Application server computer 130 includes multiple subcomponents responsible for different stages of practice test generation. These subcomponents include the practice test service 131, which manages the workflow and coordinates interactions between the models and a database 160, and various machine learning models of application server computer 130, each performing a specific task. In some implementations, application server computer 130 includes an optional segmentation model 132, an eligibility model 133, a classification model 134, an extraction model 136, a generative model 138, an optional embedding model 140, an optional attention model 142, and a ranking model 144.

Segmentation Model

In some cases, application server computer 130 includes a segmentation model 132 configured to partition input data 112 into one or more sections, enabling the system to apply further processing steps such as eligibility checks and content classification on a more granular level. For example, if provided input data 112 includes some sections that are eligible for practice test generations and other sections that are not eligible for practice test generation, the input data can be partitioned into different sections, and only sections that are eligible for practice test generation can be used. Additionally, or alternatively, if input data 112 includes a first section listing various concepts, and a second section listing questions and answers, such sections may be identified by segmentation model 132.

Segmentation model 132 can be implemented as a rule-based model that detects specific patterns within the text data to identify logical boundaries between sections. These patterns include, but are not limited to, the beginning and end of paragraphs, beginning and end of lists, changes in indentation levels, text separated by spaces, the presence of bullet points or numbered sequences, heading or subheading styles, line breaks or page breaks, quotation marks or block quote indicators, punctuation patterns such as colons or ellipses, variations in sentence length or structure, and key phrases or keywords that signal the start or end of a section. The model can also recognize enumerated answer options, enabling the identification of questions and corresponding answers within the input data.

In some cases, segmentation model 132 can also be configured to use syntactic and semantic feature extraction techniques, including part-of-speech tagging and sentence boundary detection. These techniques enable segmentation model 132 to analyze the grammatical structure and the semantic content of the text, improving the identification of logical boundaries between sections, especially in complex or unstructured data.

To implement segmentation model 132, a combination of text-processing libraries and machine-learning models (MLMs) can be employed. The rule-based approach could be developed using text processing tools such as Python's Natural Language Toolkit (NLTK) or spaCy, which offer built-in capabilities for detecting paragraph breaks, sentence boundaries, and punctuation patterns. Regular expressions can also be utilized to detect specific markers like indentation changes, lists, and bullet points. For syntactic and semantic feature extraction, models like BERT (Bidirectional Encoder Representations from Transformers) or similar transformer-based architectures can be leveraged to perform part-of-speech tagging and analyze the contextual meaning of text segments. BERT's ability to generate contextual embeddings can be particularly useful for identifying sentence boundaries and understanding the relationships between sentences, which aids in segmenting text into coherent sections. Additionally, the segmentation model can incorporate custom-trained machine learning models that classify different types of segments (e.g., questions, answers, headings) based on labeled training data, which further improves the segmentation accuracy for various document types.

In some cases, segmentation model 132 can include an unsupervised clustering algorithm such as K-means or a hierarchical clustering algorithm. Such algorithms can be used in conjunction with text embeddings to group similar sentences or paragraphs, allowing segmentation model 132 to dynamically identify and segment cohesive blocks of text even when explicit patterns are not present. Segmentation model 132 can also be made adaptive by employing reinforcement learning techniques, where the model learns segmentation strategies based on user feedback or predefined success metrics.

Eligibility Model

Further, in various embodiments, application server computer 130 includes an eligibility model 133. Eligibility model 133 is configured to determine whether a given input data 112, or its segmented sections, are suitable for generating practice test content. In various embodiments, eligibility model 133 serves as a gatekeeper by filtering out ineligible inputs. Eligibility model 133 evaluates the input data 112 by identifying a language and a subject associated with each section or the entire input. Eligibility model 133 then determines if the identified language is part of a predefined set of supported languages and if the identified subject is part of a predefined set of recognized subjects. This eligibility model 133 ensures that only relevant content is processed further, filtering out content that may not be appropriate for practice test generation, such as data in unsupported languages or subject areas.

The eligibility model can be implemented using a large language model that is capable of performing language detection and subject classification. For example, transformer-based models such as BERT or GPT, which have been pre-trained on a large-scale corpus of multilingual and multi-domain text, can be fine-tuned for this specific task. The language detection component of the model can analyze the input text and classify it into one of several supported languages, ensuring that only texts in recognized languages are considered eligible. This detection can be performed using a multilingual model like XLM-R (Cross-lingual Language Model—ROBERTa) that supports various languages and provides robust language classification.

For subject classification, eligibility model 133 can be further fine-tuned on labeled training data that categorizes text inputs into specific subjects, such as Mathematics, Biology, History, Physics, and the like. During training, eligibility model 133 is configured to learn to recognize specific keywords, phrases, and contextual indicators that are characteristic of each subject area. For instance, if a text input contains terms like "derivative," "integral," and "calculus," the model could classify the content as being related to Mathematics. The subject classification component can be developed using a hierarchical classification approach, where broader categories (e.g., Science, Humanities) are identified first, followed by more granular subcategories (e.g., Chemistry, Physics, and History).

In addition to using pre-trained language models, eligibility model 133 can also use rule-based techniques for initial filtering, such as detecting the presence of specific metadata or tags provided by the user. For example, if the input data includes metadata indicating the subject and language, the model can use these attributes to perform a quick eligibility check before conducting a more detailed analysis using machine learning. This multi-layered approach of combining rule-based techniques with machine learning models can result in eligibility model 133 being efficient and accurate in assessing whether an input should proceed to the next stages of processing.

Additionally, a confidence score for each eligibility determination can be generated by eligibility model 133. For example, eligibility model 133 can generate a confidence score for both the language detection and subject classification components, and if the confidence score falls below a certain threshold, the input can be flagged for manual review or additional processing. Eligibility model 133 can also employ probabilistic methods, such as Bayesian Networks or Gaussian Processes, to refine its confidence estimates and make more informed decisions about the eligibility of complex or noisy data.

Classification Model

In various embodiments, application server computer 130 includes a classification model 134. In various embodiments, classification model 134 can be a machine learning model configured to analyze segmented sections of input data 112 and determine whether each section represents a question, an answer, or another type of text content. One of the functions of classification model 134 is to distinguish between different types of content and label each segment of input data 112 accordingly, enabling the system to identify candidate questions and answers within the input data.

In various embodiments, classification model 134 is configured to identify candidate questions and answers from the practice-test-type input. For example, classification model 134 can classify a first selection from the input as a candidate question and a second selection as a candidate answer. Classification model 134 performs this function by analyzing the content and structure of the text segments and applying learned patterns to determine whether a segment is more likely to be a question or an answer.

In various embodiments classification model 134 can be a large language model trained on a labeled training dataset, where training text is labeled with question-specific labels for segments corresponding to questions and answer-specific labels for segments corresponding to answers. This implies that classification model 134 has been trained to recognize the linguistic and semantic features typical of questions and answers, such as interrogative structures (e.g., "What is . . . ?", "How does . . . ?") for questions and declarative or explanatory statements for answers. By using a labeled training dataset, classification model 134 learns to differentiate between questions and answers with high accuracy, even when the language and structure vary across different input types.

Classification model 134 can be implemented using transformer-based architectures, such as BERT or GPT, which have been fine-tuned on the labeled training data to perform this specific classification task. Classification model 134 analyzes each segment in context, considering both the local (word-level) and global (sentence- or paragraph-level) features to determine its classification. For example, if a segment begins with a keyword like "Explain" or "Describe," classification model 134 may classify it as a question, while a segment containing phrases like "The answer is" or "It can be defined as" might be classified as an answer. Additionally, classification model 134 can employ attention mechanisms to focus on words and phrases that are indicative of questions or answers, further refining its predictions.

In some cases, classification model 134 can be implemented as an Information Maximizing Generative Adversarial Network (Info-GAN) trained on a synthetic training dataset. Such Info-GAN can be adapted to help classify questions and answers by learning distinct and interpretable representations of these two content types. In this specific context, classification model 134 can be set up with two main parts: a generator and a discriminator, along with an additional auxiliary network. The generator creates synthetic text segments based on random inputs combined with a special code that represents whether the text should look like a question or an answer. The discriminator's role is to differentiate between real and generated segments, while the auxiliary network tries to predict the code used to generate the text segment (i.e., whether it was meant to be a question or an answer). In this context, a generator of classification model 134 can be trained to produce text segments that are realistic and accurately represent questions and answers. Further, a discriminator can be trained to accurately classify generated segments as questions or answers.

In some cases, classification model 134 can be implemented as a foundation large language model (LLM) that has been pre-trained on a broad, large-scale language corpus. Additionally, classification model 134 can undergo further training using a labeled training dataset, with the training data selected specifically based on the identified subject of the practice-test-type input. As a foundation model, classification model 134 benefits from having a comprehensive understanding of the language before being fine-tuned for the specialized task of classifying questions and answers. This two-step training process allows classification model 134 to generalize effectively across various subjects and adapt to domain-specific content with improved accuracy. In some instances, classification model 134 can be a variant of a GPT model, such as ChatGPT 3.5.

Further, classification model 134 can be configured to handle ambiguous sections in the input data using uncertainty estimation techniques, such as Monte Carlo Dropout or Bayesian Neural Networks. These techniques quantify the confidence level of classification model 134's predictions, enabling classification model 134 to flag segments that are difficult to classify or have low confidence scores. For example, if a segment is neither clearly a question nor an answer, for example, due to vague language or insufficient context, classification model 134 can assign a lower confidence score to its prediction and flag the segment for further review or reprocessing.

Additionally, or alternatively, classification model 134 can use contextual shifts between sections to identify questions and answers. These shifts are detected by analyzing changes in linguistic features, such as interrogative structures, sentence modality, or semantic cues characteristic of questions, and declarative structures or explanatory context characteristic of answers. By tracking these shifts, classification model 134 can more accurately determine where questions end and answers begin, especially in complex or unstructured inputs.

In certain scenarios, when the input data 112 includes one or more sections that cannot be clearly identified as either a question or an answer, the classification model 134 may classify such sections as neither. Alternatively, the classification model 134 may categorize these sections as a concept section, introduction section, summary section, or similar types.

Extraction Model

Further, in various embodiments, application server computer 130 includes an extraction model 136. Extraction model 136 is designed to extract questions and answers identified by classification model 134. When classification model 134 determines that a specific section of the input data is a question, extraction model 136 extracts that section and stores it separately as a question in an appropriate database, such as database 160. Similarly, extraction model 136 can extract the corresponding answer and store it in database 160, as further detailed below.

Extraction model 136 can be implemented as a code that extracts sentences or sections based on labels such as "question," "answer," "neither question nor answer," "concept," "introduction," or similar, as assigned by classification model 134. For example, when classification model 134 assigns a "question" label to a section, extraction model 136 identifies and processes it accordingly.

If classification model 134 identifies a section of input data 112 as neither a question nor an answer, extraction model 136 can store such sections in database 160 with an indication that they are neither. In some cases, these sections may also be linked to one or more related questions and/or answers stored in database 160, as further described below.

Generative Model

Additionally, in various embodiments, application server computer 130 includes a generative model 138. The generative model 138 is configured to generate answers and, in certain cases, questions, as further detailed below.

In various embodiments, generative model 138 is configured to generate a suggested answer based on a candidate question extracted from a practice-test-type input. The candidate question may be identified by classification model 134, which analyzes input data 112 to determine which parts of input data 112 correspond to questions. Once classification model 134 classifies a segment of input data 112 as a candidate question, generative model 138 can be used to produce a corresponding suggested answer. In some cases, if classification model 134 identifies a candidate answer, this answer can be represented as a first word embedding, serving as a vectorized representation of the extracted content. Similarly, the suggested answer generated by generative model 138 can be represented using a second word embedding for comparison.

Generative model 138 can leverage its broad language understanding, developed through pre-training and fine-tuning, to generate coherent and contextually relevant answers to the identified questions. Depending on the scenario, the suggested answer may either be a newly generated response created by the model or an existing answer retrieved from a suitable database, as further detailed below.

In various embodiments, generative model 138 can be implemented using a large language model (LLM) architecture such as a Transformer-based model (e.g., GPT, BERT, or Text-To-Text Transfer Transformer), which has been pre-trained on a massive corpus of text data and further fine-tuned for the specific task of generating answers and questions for practice test-type inputs. The implementation involves two main phases: pre-training and fine-tuning, followed by a process to evaluate its performance and suitability for practice test generation.

In one implementation, the initial phase of training generative model 138 involves training it as a foundational LLM on a diverse and extensive corpus of text data. The pre-training process typically leverages the transformer architecture, which consists of multiple layers of self-attention mechanisms and feed-forward networks. The self-attention layers allow the model to capture relationships between words, phrases, and sentences within the context of large-scale text data. During this pre-training phase, the model learns general language structures, semantics, and contextual dependencies without any specific focus on practice tests.

The training dataset used in this phase can include various sources such as books, articles, websites, and research papers to ensure the model gains a broad understanding of grammar, syntax, and general world knowledge. The pre-training objective is usually a language modeling task, such as predicting the next word in a sentence (as in GPT models) or filling in missing words (as in BERT). This objective helps the model learn how language is typically structured and how to generate fluent and coherent text.

Once generative model 138 is pre-trained, it undergoes a fine-tuning phase using a specialized training dataset that is more relevant to the specific application of generating practice test questions and answers. This fine-tuning dataset can consist of labeled examples of practice test questions, answers, and related instructional content. The dataset is annotated to include domain-specific information based on subjects such as Mathematics, Science, or History, which aligns with the context of the input data provided by users.

During fine-tuning, generative model 138 is exposed to input data labeled with specific attributes, such as question labels or answer labels, and is trained to generate text segments that match these labels. The training objective during fine-tuning could involve minimizing the cross-entropy loss between the generated sequences and the ground truth sequences (e.g., correct answers to questions), ensuring that the model learns to produce accurate and contextually relevant content. This fine-tuning step allows the model to focus on the generation of practice test-type content and increases its ability to handle specific domain knowledge.

After training, generative model 138 can be evaluated on a separate validation set to assess its performance. Metrics such as BLEU (Bilingual Evaluation Understudy), ROUGE (Recall-Oriented Understudy for Gisting Evaluation), and perplexity can be used to measure the relevance of the generated content. If generative model 138 is integrated with similarity measurements, additional evaluation criteria may include similarity scores between generated and expected answers to ensure that the content is contextually accurate.

In some cases, generative model 138 may be a more advanced large language model (LLM) compared to classification model 134. For instance, generative model 138 may be implemented using GPT-4.0, whereas classification model 134 may be based on GPT-3.5. Although generative model 138 may be configured to perform the same tasks as classification model 134, including identifying questions and answers in input data 112, classification model 134 may be generally preferred for this role because it is more efficient and requires less computational power and training resources compared to generative model 138. This makes classification model 134 a more suitable choice for initial processing and classification tasks, while generative model 138 can be reserved for generating content when needed.

Besides generating answers, the generative model 138 may also generate questions based on concepts identified by the classification model 134. For instance, if classification model 134 determines that input data 112 includes sections unrelated to a practice test (or if the entirety of input data 112 does not correspond to a practice test), the generative model 138 can generate questions derived from the identified concepts. For example, if the input data 112 contains the concept "Newton's Laws of Motion," the generative model 138 might generate questions like: What are Newton's three laws of motion? How does Newton's second law apply to a situation where a car accelerates on a flat road?

Further, the generative model 138 can generate suitable answers based on the concepts discussed in input data 112. For instance, in response to the question "What are Newton's three laws of motion?" the generative model 138 might generate the following answer: Newton's first law states that an object at rest will remain at rest, and an object in motion will remain in motion unless acted upon by an external force. Newton's second law explains that force equals mass times acceleration (F=ma). Newton's third law states that for every action, there is an equal and opposite reaction.

In various cases, the generated questions and answers, along with the relevant sections of input data 112 that resulted in their creation, can be stored relationally in a database 160. Furthermore, based on specific input to the generative model 138, questions and answers can be generated in particular styles. For example, if the input specifies generating multiple-choice questions, the generative model 138 can produce such questions.

For instance, for the concept "Newton's Laws of Motion," a multiple-choice question might be:
Which of the Following Best Describes Newton's First Law of Motion?
  A. The acceleration of an object is directly proportional to the net force acting on it.
  B. For every action, there is an equal and opposite reaction.
  C. An object at rest stays at rest, and an object in motion stays in motion unless acted upon by an external force.
  D. The total energy in a closed system remains constant.

Other styles of questions may include fill-in-the-blank or free-response questions. For example, for the same concept, the generative model 138 might produce:

Fill-in-the-blank question: "Newton's second law of motion is represented by the equation _____=mass×acceleration." Answer: Force.

Free-response question: "Explain how Newton's third law applies when a person jumps off a small boat onto a dock." Answer: When the person pushes off the boat to jump, they apply a force to the boat. In turn, the boat applies an equal and opposite force, causing it to move backward.

Consequently, the various questions and answers generated for a concept identified in the input data 112 can be stored relationally in database 160, enabling efficient retrieval and use in various contexts.

Embedding Model

Additionally, in various embodiments, application server computer 130 includes an embedding model 140. In various embodiments, embedding model 140 is configured to transform the textual data from input data 112 into high-dimensional vector representations that encapsulate the semantic and contextual meaning of the text (also referred to herein as "input text"). These vectorized representations, referred to as word embeddings, are used for various tasks, such as similarity measurement, classification, and generation of practice test content. Embedding model 140 can be used to represent the extracted candidate answer (i.e., the answer as identified by classification model 134, or the answer that can be retrieved from a database 160 corresponding to the question identified by classification model 134) as a first word embedding and the suggested answer generated by generative model 138 as a second word embedding. These embeddings are then compared to measure similarity, allowing the system to determine the suitability of the candidate answer for inclusion in the practice test. In some cases, embedding model 140 is configured to generate multi-level embeddings, including word-level, sentence-level, and paragraph-level embeddings. This approach allows the model to capture different granularities of information: word-level embeddings reflect individual word meanings, sentence-level embeddings capture contextual relationships within a sentence, and paragraph-level embeddings consider the broader context across multiple sentences or paragraphs. These multi-level embeddings enable a comprehensive similarity comparison by aligning the embeddings at different levels of granularity, ensuring that the system can identify semantic relationships between the candidate answer and the suggested answer even when the content structure varies.

In various embodiments embedding model 140 is capable of implementing advanced neural network architectures, such as Transformer-based models like BERT, GPT, or T5, to generate contextual embeddings that capture word meanings based on their usage within the surrounding text. Alternatively, Word2Vec, GloVe, or FastText can be used.

In various embodiments, when implemented as a transformer-based model, embedding model 140 can be pre-trained on large-scale language corpora using training objectives such as masked language modeling or next-sentence prediction to learn general language patterns. Subsequently, the model can be fine-tuned on domain-specific data relevant to practice-test-type inputs to refine its ability to capture subject-specific terminology and structures.

Attention Model

Further, in various embodiments, application server computer 130 includes an attention model 142. In various embodiments, attention model 142 is configured to enhance the accuracy of similarity calculations and content extraction by assigning different importance weights to individual words or phrases within the input data. The similarity calculations can be performed for determining similarity between a first text and a second text. The first text and the second text can be any suitable text representing questions, answers, concepts, and the like.

In some embodiments, attention model 142 can be configured to weigh the significance of words or phrases within the candidate answer and suggested answer or a candidate question and suggested question. This attention mechanism assigns higher weights to words or phrases that are deemed contextually significant, which allows the system to capture the most relevant parts of the text when comparing candidate and suggested answers or candidate and suggested questions. For instance, if a candidate answer includes key phrases such as "primary cause" or "main effect," attention model 142 would assign these phrases higher weights during the embedding process, ensuring that they contribute more to the final similarity score between the candidate and suggested answers. This weighted comparison can be particularly useful when measuring semantic similarity between the two word embeddings, as it helps the system focus on the most meaningful components of the content rather than treating all words equally.

Ranking Model

In various embodiments, application server computer 130 also includes a ranking model 144. In various embodiments, ranking model 144 is configured to prioritize and order questions and answers generated or retrieved by the system based on their relevance, quality, or other predefined criteria (e.g., difficulty). In various embodiments, ranking model 144 is configured to assign a ranking score to each question and/or answer based on how well it matches concepts described in input data 112. Ranking model 144 is particularly useful when multiple candidate questions or answers are generated or retrieved, allowing the system to select and present the most relevant content for practice test generation.

In some cases, ranking model 144 can be employed to refine and improve the output of other models, such as generative model 138 or classification model 134. For example, when multiple suggested answers are generated by generative model 138 for a single candidate question, ranking model 144 can be used to evaluate these answers and prioritize them based on factors such as semantic relevance, coherence, and clarity. Similarly, if multiple question-answer pairs are retrieved from a question-answer database, ranking model 144 can rank these pairs to identify the ones that are most closely aligned with the input question or context.

Ranking model 144 can be implemented using various machine learning techniques, including pointwise, pairwise, or listwise ranking approaches. In a pointwise ranking approach, ranking model 144 evaluates each item independently and assigns a score based on its features. In a pairwise ranking approach, ranking model 144 considers pairs of items and learns to predict which one is better, improving the ranking based on relative comparisons. In a listwise ranking approach, ranking model 144 directly improves the entire ranking of a list of items to ensure that the top-ranked items are as relevant as possible.

To support these ranking strategies, ranking model 144 can utilize advanced neural architectures such as transformer-based models, including cross-encoder models or bi-encoder models. A cross-encoder ranking model compares the input text and candidate content jointly, using attention mechanisms to capture complex interactions between them. This approach allows ranking model 144 to produce highly accurate ranking scores by considering the full context of both the input and the candidate content simultaneously. A bi-encoder model, on the other hand, generates separate embeddings for the input and candidate content and then measures their similarity using metrics such as cosine similarity or dot product. This approach is computationally efficient and well-suited for large-scale ranking tasks.

In some embodiments, ranking model 144 can also incorporate LambdaMART, a tree-based ranking algorithm that is effective for improving ranking tasks with specific constraints, such as maximizing precision or minimizing errors in the top-ranked items. LambdaMART uses gradient boosting to learn a series of decision trees, with each tree focusing on correcting the ranking errors of the previous trees. This iterative refinement allows LambdaMART to produce a robust ranking model that can handle complex relationships between features.

To evaluate the performance of ranking model 144, metrics such as Mean Reciprocal Rank (MRR), Normalized Discounted Cumulative Gain (NDCG), or Precision at K (P@K) can be used. These metrics measure how well the top-ranked items align with the expected output, ensuring that the system consistently produces high-quality content for practice test generation.

Question-Answer Database

In various embodiments, application server computer 130 is communicatively coupled to database 160. In some cases, database 160 may serve as a question-answer database that stores a collection of questions and their corresponding answers. Database 160 may have an associated server that is configured to receive search requests from application server computer 130, perform searches within database 160, and return the relevant data back to application server computer 130 based on the search results.

In various embodiments, question-answer database 160 is configured as a specialized storage system designed to store and manage a large collection of question-answer pairs that can be accessed and utilized during the practice test generation process. This database serves as a repository for existing educational content, which can be queried and retrieved based on semantic similarity to the input data. To facilitate efficient searching and retrieval of question-answer pairs, question-answer database 160 employs indexing and embedding techniques, enabling quick access to the most relevant content based on the context of the input query.

Question-answer database 160 is structured to include multiple layers of indexing, such as a question embedding index and a question metadata lookup index. The question embedding index stores vectorized representations (embeddings) of the questions in the database, allowing for rapid similarity-based searches. Each question is converted into a high-dimensional vector using embedding model 140, capturing the semantic and contextual meaning of the question. These embeddings are stored in the question embedding index, making it possible to perform vector-based searches to find questions that are semantically similar to a given input.

To support efficient and scalable similarity searches, the question embedding index can use vector search algorithms, such as FAISS (Facebook AI Similarity Search), which uses quantization and partitioning techniques to reduce the dimensionality of the embeddings and enable fast approximate nearest neighbor searches. The FAISS index allows the server of database 160 to identify the top-k closest questions in database 160 based on their vector representations, even when the number of stored questions is very large. This capability is useful for finding relevant question-answer pairs that match the input text, ensuring that the server of database 160 can retrieve the most suitable content for practice test generation.

In addition to the question embedding index, the question metadata lookup index is used to store and retrieve metadata associated with each question-answer pair. Metadata may include attributes such as subject, difficulty level, topic, and other tags that describe the content of the question and its corresponding answer. This metadata index allows performing filtered searches based on specific criteria, such as retrieving questions only from a particular subject (e.g., mathematics) or filtering results based on difficulty level (e.g., beginner, intermediate, advanced). By using this metadata index, the server of database 160 can refine its searches and provide more targeted question-answer pairs that align with the user's requirements or the context of the practice test input.

The combination of the question embedding index and the question metadata lookup index enables a multi-faceted search approach. When a query is made, the server of database 160 may perform a vector search for a question (or an answer) within database 160. When performing a vector search, vector similarity search using the question embedding index can be used to identify the most semantically relevant question. In some cases, the question metadata lookup index can also be used to narrow down the search space based on high-level attributes such as subject or topic.

Once the relevant question-answer pairs are retrieved, they can be ranked and further processed using other components of the system, such as ranking model 144, to ensure that the final practice test content is of the highest quality.

Figure 2:
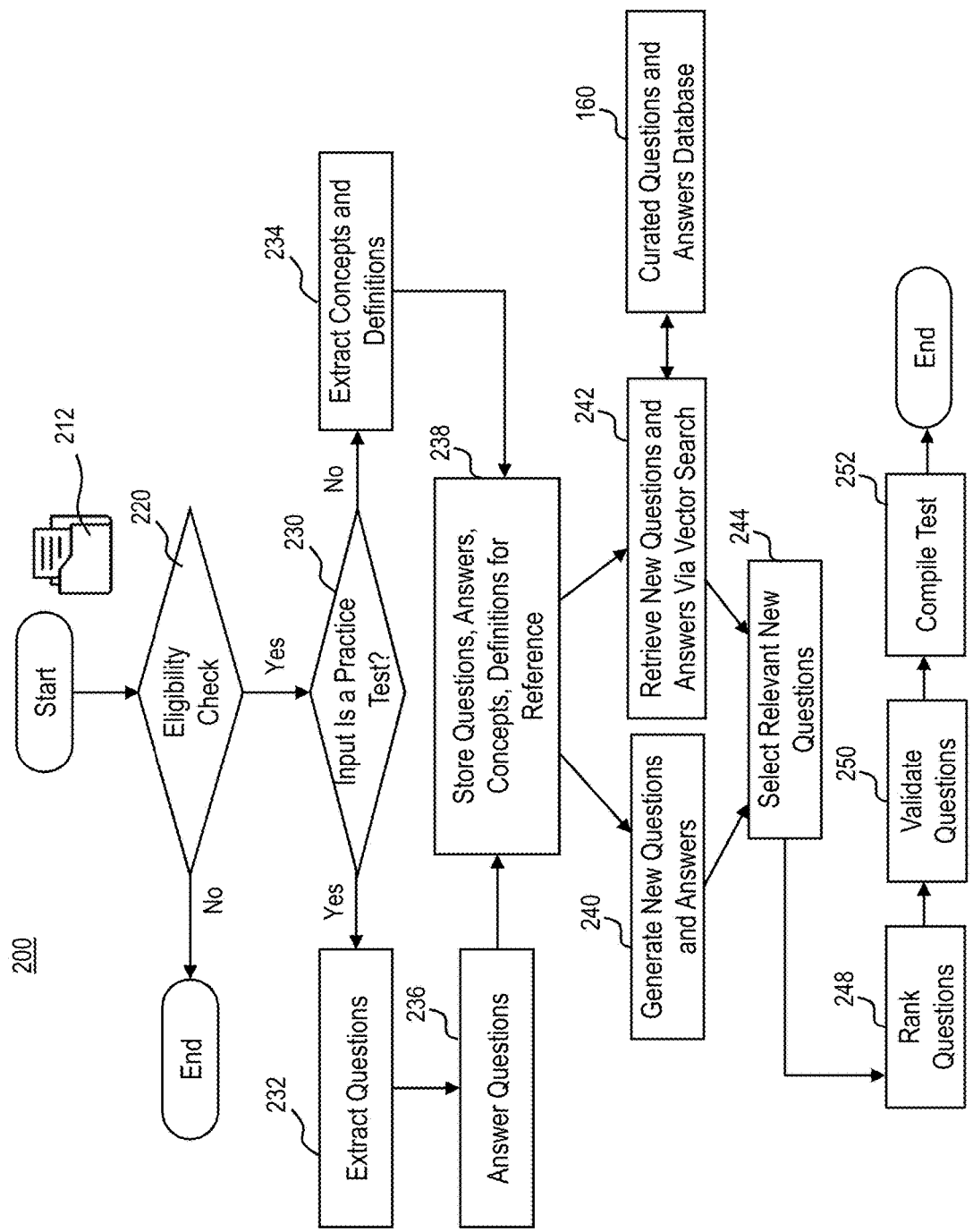
FIG. 2 provides an illustrative flowchart outlining a process for generating a practice test in accordance with one or more embodiments.

FIG. 2 shows an example flowchart describing a method 200 for generating or extracting practice test questions based on input data 212, which can be a document or other content related to a practice test. In various embodiments, input data 212 may be similar or the same as input data 112, as shown in FIG. 1. In various embodiments operations of method 200 are performed by application server computer 130.

At operation 220, the application server computer 130 conducts an eligibility check, utilizing the eligibility model 133, as previously described in connection with FIG. 1. This eligibility check involves verifying whether the input data 212 is in English or another suitable language determined to be eligible for test preparation. Additionally, it evaluates whether the subject matter within the input data 212 corresponds to eligible categories, such as Arts and Humanities, Science, Social Science, Math, Language, or other suitable subject matters. In certain scenarios, categories like Math and Language Learning may be excluded from eligibility, while in other cases, different subject matters might be deemed ineligible. If the input data is deemed not to be eligible (operation 220, No), method 200 may be completed. Alternatively, If the data is determined to be eligible (operation 220, Yes), method 200 proceeds to operation 230 to determine if input data 212 is a practice test.

At operation 230, whether input data 212 is a practice test or just a list of concepts that can be used for formulating a practice test can be made based on a content analysis using classification model 134, which can identify questions within input data 212. If questions are identified in the input data 212 (operation 230, Yes), method 200 proceeds to operation 232 at which questions are extracted from input data 212 (or identified within input data 212). Such extraction of questions can be achieved by extraction model 136, as described above.

If no identifiable questions are found in the input data 212, as indicated by the decision operation 230 (operation 230, No), method 200 proceeds to operation 234, where concepts and definitions are extracted from input data 212. In various cases, at operation 230, classification model 134 can identify questions, answers, concepts, definitions, formulas, and the like, and label each portion of input data 212 with a corresponding label, such as "question," "concept," "definition," "answer," and the like. Subsequently, at operation 234, all segments of input data 212 corresponding, for example, to definitions and concepts, can be extracted.

Following the completion of operation 232, generative model 138 can be used at operation 236 to generate answers to the questions extracted during operation 232. For a given question extracted from input data 212, the generative model 138 may reference the question-answer database 160. If a matching question-answer pair is identified in the database, the model selects the most relevant pair to provide an answer closely aligned with the extracted question. Alternatively, if no suitable match is found, the generative model 138 generates an answer directly based on the extracted question and the knowledge it possesses. The knowledge within generative model 138 is obtained through pre-training on extensive datasets that includes diverse topics, including scientific literature, encyclopedic data, and domain-specific information. Additionally, generative model 138 may be fine-tuned with specific data relevant to its application, such as curated educational materials, industry documents, or proprietary databases. This allows generative model 138 to synthesize responses based on patterns and context derived from its training and fine-tuning processes.

After questions are extracted during operation 232 and answers are generated at operation 236, method 200 advances to operation 238, where the questions and answers are stored in database 160. Alternatively, these questions and answers may be saved in a dedicated question bank, a memory storage space specifically designed for organizing content for a particular practice test. Additionally, if it was determined during operation 230 that the input data 212 does not contain a pre-existing practice test (operation 230, No), but instead includes concepts and definitions extracted at operation 234, these concepts and definitions can also be stored in the question bank at operation 238. This enables their later use in the creation of a new practice test.

After completing operation 238, method 200 proceeds to operations 240 and 242 at which new questions and answers are generated at operation 240 and new questions and answers are retrieved from question-answer database 160 via vector search at operation 242.

In some cases, new questions can be generated based on the concepts identified within input data 212. For instance, if the input data 212 consists of a textbook chapter or lecture notes without any pre-existing questions, generative model 138 can analyze the text to identify key concepts and topics discussed within the content. Using these identified concepts, generative model 138 constructs relevant questions. For example, if input data 212 describes the process of photosynthesis, generative model 138 might generate questions such as "What is the role of chlorophyll in photosynthesis?" or "How does sunlight contribute to the photosynthesis process?" These generated questions are then passed on to the next operations, such as re-ranking and validation, as further described in the flowchart of FIG. 2. By generating new questions based on the core ideas present in the input text of input data 212, application server computer 130 ensures that even content without explicit questions can be transformed into a structured practice test, providing users with meaningful test material.

At operation 242, the concepts and definitions obtained during operation 234 can be converted into vector embeddings. These embeddings are then used to perform a vector search within database 160 to identify the most closely related questions based on the generated embeddings. Once identified, the corresponding questions can be retrieved and incorporated into the practice test. In cases where question-answer pairs are available in database 160, both the questions and their corresponding answers can be retrieved for use in the practice test.

Once the questions and answers are extracted (as in operation 234), generated (as in operation 240), and/or retrieved from database 160 through vector search (as in operation 242), relevant new questions are selected for inclusion in the practice test at operation 244. In some cases, the selected questions may represent a subset of the generated, extracted, or retrieved questions, chosen based on specific relevance criteria. Alternatively, all the questions obtained in the preceding operations may be included in the practice test, depending on the desired scope and purpose of the test.

Further, at operation 248, ranking model 144 can be employed to prioritize and order the questions based on their relevance, quality, and alignment with the input data. The ranking model uses metrics such as semantic similarity, coherence, and relevance scores to select the top questions. The ranking process can use a cross-encoder model such as Cohere Reranking API, where a particular text (e.g., a particular concept or original extracted question from input data 212) is treated as a query, and generated questions are treated as documents for reranking. To enhance accuracy and ensure relevance, the query includes the name of the generated question bank from a prior step, ensuring that the top-ranked questions align with the same subject matter. This process selects a specific number of questions (e.g., two, three, four, five, six, or a similar range) for each original question or concept.

After ranking operation 248, method 200 proceeds to operation 250, where the re-ranked questions undergo a comprehensive validation process. This validation operation can involve the use of both advanced machine learning models and predefined rule-based systems to review each question for factual accuracy, grammatical correctness, and alignment with the original input content.

The use of machine learning models in the validation process allows for automated and intelligent evaluation of various aspects of the questions. For example, a fact-checking model can be employed to verify the correctness of the information presented in the questions and answers by cross-referencing with a database of trusted sources. For instance, if a generated question states, "What is the capital of Canada?" and the suggested answer is "Toronto," the fact-checking model would flag this as incorrect and suggest "Ottawa" as the correct answer. Similarly, a grammar-checking model, such as T5 or BERT, can be used to detect and correct grammatical errors. If a question is phrased awkwardly, such as "What is photosynthesis's role?" the grammar-checking model would identify this as an error and suggest the corrected form, "What is the role of photosynthesis?" Furthermore, a semantic consistency model may be utilized to ensure that the question and answer are logically coherent and contextually related. If a question asks, "What is the function of mitochondria?" and the answer states, "It is responsible for the process of photosynthesis," the semantic consistency model would detect the mismatch and prompt for a correction, such as "Mitochondria generate energy for the cell."

In addition to using machine learning models, rule-based systems are applied to enforce specific logical and structural standards for the questions and answers. These rules provide a structured framework that the questions can follow to be considered valid. For example, format rules can ensure that each question begins with an interrogative word (e.g., "What," "How," "Why") and ends with a question mark. If a question does not follow this rule, such as "Describe the process of photosynthesis," the rule-based system would suggest rephrasing it to "What is the process of photosynthesis?" to align with the expected format. Similarly, answer length rules specify that responses should not exceed a certain word count or that short-answer questions can have concise answers. If a generated answer for a short-answer question is too detailed or verbose, the rule-based system can flag it as needing simplification.

The validation operation also leverages rules that prohibit the use of ambiguous or unclear phrases. For instance, if a question includes vague terms such as "kind of" or "sort of," the rule-based system can flag these terms and suggest removing or replacing them with clearer language. This ensures that the questions are straightforward and unambiguous, enhancing their quality and clarity. By utilizing both machine learning models and rule-based systems, the validation process ensures that the generated or extracted questions are factually accurate, grammatically sound, and contextually aligned with the original input content. This multi-faceted approach can be used to reduce errors.

Method 200 concludes with operation 252, where the final practice test is compiled by listing the validated questions and corresponding answers. The compiled practice test can be formatted and presented to the user in various ways, depending on the desired interface and user preferences. For example, one common method of presentation is through digital flashcards, where each question is displayed on one side of a digital card, and the answer is revealed when the user chooses to flip the card. This interactive format is particularly effective for self-paced study, enabling users to review each question and answer individually and promoting active recall during the learning process.

Alternatively, the compiled practice test can be displayed as a conventional list of questions and answers, where all questions and their corresponding answers are shown in a sequential order. This format is suitable for users who prefer to read through all the material at once or for printing purposes, allowing the user to have an offline version of the test for review. The list format can also include additional elements such as the categorization of questions by topic or difficulty level, enabling users to focus on specific areas where they may need further practice.

Furthermore, the compiled practice test can be presented using other interactive formats such as multiple-choice quizzes, where the generated questions are shown with several answer options, and users can select the correct one. This format simulates traditional exam conditions and can be used to assess the user's knowledge and understanding in a more structured manner. Similarly, short-answer or fill-in-the-blank formats can be used, where users are prompted to provide answers based on the generated questions, and the system automatically evaluates the responses for correctness.

The compiled test can also be displayed through a dynamic graphical user interface (GUI) that adapts based on user input. For instance, the system may present the first question and allow the user to interactively navigate through subsequent questions. This interface may also include options for reviewing specific topics, flagging questions for later review, or providing hints for challenging questions. In addition, the compiled test can be integrated with analytics tools that track user performance, such as recording the number of correct answers, measuring response time for each question, and providing feedback on areas that need improvement.

In some embodiments, the compiled practice test may also include supplementary content such as explanatory notes or additional reference materials for each question. For example, if a question asks about a specific scientific concept, the compiled test could include a short paragraph or a hyperlink to a resource that further explains the concept, thereby providing users with immediate access to more in-depth information.

Overall, the compiled practice test generated in operation 244 is flexible and can be tailored to suit various user needs and preferences.

Figure 3:
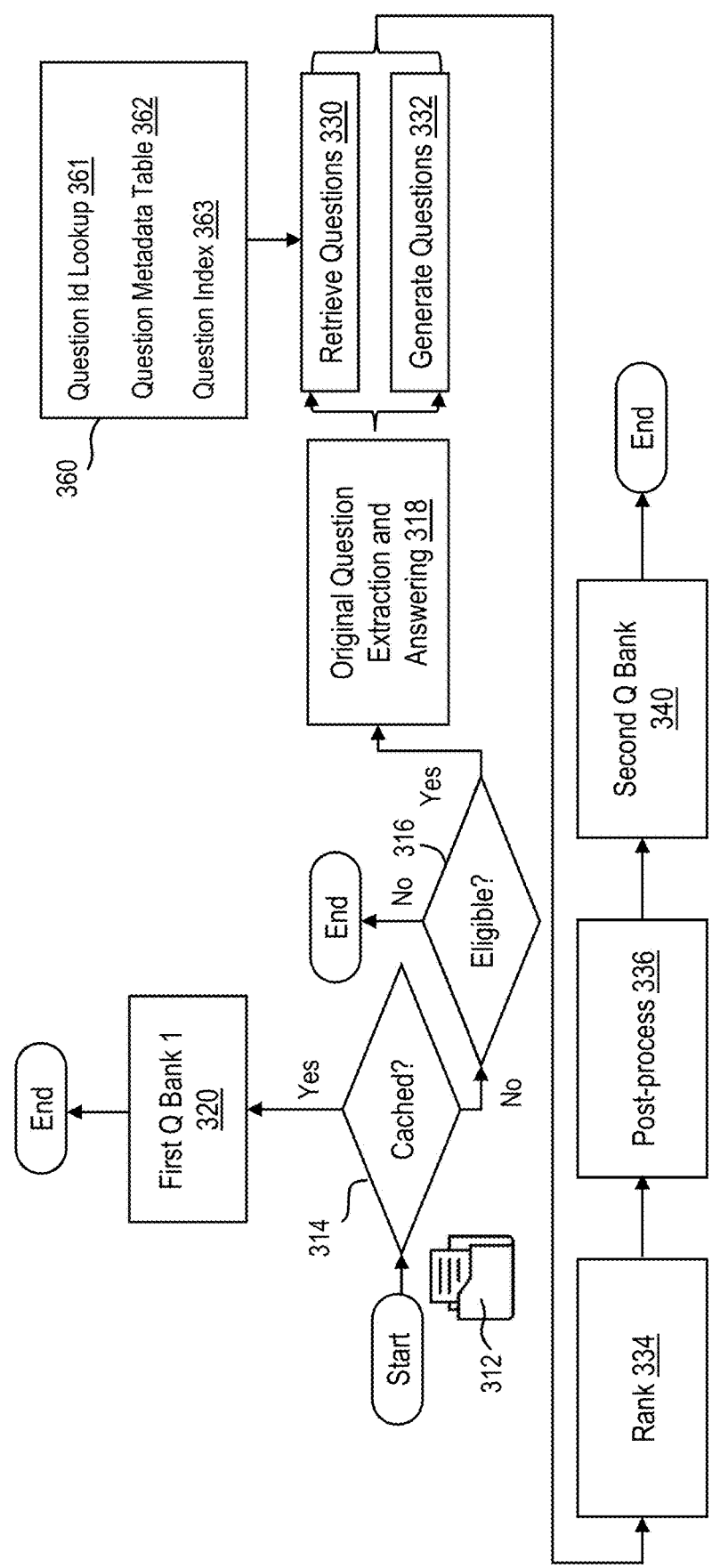
FIG. 3 depicts another illustrative flowchart describing a process for generating a practice test in accordance with one or more embodiments.

FIG. 3 illustrates a flowchart of method 300, which describes the workflow for generating, retrieving, and processing practice test questions using a combination of machine learning models and database operations. This process is executed as a practice test service operated by application server computer 130, which is configured to initiate and manage the entire practice test generation workflow. The practice test service is responsible for receiving input data, such as study materials or user requests, and performing initial verification and preprocessing before handing it off to subsequent operations. Additionally, the practice test service provides the processed input data to the ML Practice Test Service, which performs further data processing using various models, including models 132-138 as illustrated in FIG. 1. Moreover, the practice test service integrates with external interfaces, such as web or mobile applications, to facilitate user interactions and ensure seamless communication throughout the process.

At operation 314, method 300 receives input data 312, which contains the content used for generating the practice test. In various embodiments, input data 312 can be similar to or the same as input data 212 or input data 112, as depicted in respective FIGS. 2 and 1. In some instances, input data 312 may include additional metadata provided via the practice test service to the ML Practice Test Service. This metadata may include parameters for configuring models 132-138, descriptions of the input data, guidance information for the models during data processing, details about the user's device, and instructions on how the practice test data should be presented to the user.

Metadata associated with input data in method 300 includes a variety of attributes and parameters that guide the practice test generation process. Examples of such metadata include subject information, difficulty level, question format, user preferences, contextual information, user interaction data, model configuration parameters, and the like. For instance, subject information can specify the subject or topic of the input data, such as "Biology," "Physics," or "History," enabling the models to focus on generating questions relevant to the specified field. Difficulty level metadata can indicate the desired complexity of the questions, such as "Beginner," "Intermediate," or "Advanced," allowing the system to tailor the questions to match the user's proficiency level. Metadata related to question format can define the type of questions to be generated, such as multiple-choice, short answer, true/false, or descriptive questions, thereby ensuring that the generated content aligns with the desired format.

User preferences may include specific topics or subtopics the user wants to concentrate on, such as "Photosynthesis" within Biology, to generate targeted questions. Contextual information can provide additional background, such as summaries or descriptions of the input data, which can help the models better understand the content and produce more relevant questions and answers. Presentation instructions within metadata can define how the final practice test should be displayed, such as through digital flashcards, list formats, or interactive quizzes, and may include specifications for visual styles, fonts, or layout preferences. Additionally, metadata can include user interaction data, such as frequently missed questions, areas where the user struggled, or specific sections flagged for review. This historical information can guide the system to generate practice tests that focus on areas needing improvement.

Model configuration parameters within the metadata may describe specific settings for configuring the models, such as the number of questions to generate, thresholds for similarity scores when matching questions, or parameters for adjusting the granularity of content segmentation. These configuration parameters provide further control and customization over the practice test generation process, ensuring that the generated content meets the user's needs and expectations.

At operation 314, method 300 determines whether there is any cached data available for the practice test. If the data is cached (operation 314, Yes), method 300 retrieves the cached questions from a first question bank 320 and provides them for the practice test. Specifically, input data 212 is hashed to generate a unique key, which is then used to cache the mapping between the hash value and the ID of the question bank created for that specific input. For new requests, if the hash of the input matches an existing cached entry, the corresponding question bank ID is used to retrieve the pre-existing question bank, which is then provided for the practice test. If no cached data is found (operation 314, No), method 300 moves to operation 316, where the eligibility of the input data 312 is evaluated for use in generating a practice test. Eligibility is determined using eligibility model 133, as described in relation to FIG. 1. If input data 312 is found to be ineligible (operation 316, No), method 300 terminates. However, if input data 312, or any segment thereof, is determined to be eligible (operation 316, Yes), method 300 proceeds to operation 318.

At operation 318, classification model 134 is employed to classify input data 312. Classification model 134 first identifies the type of input data 312. For example, classification model 134 determines whether input data 312 is a practice-test-type input or a non-practice-test-type input. A practice-test-type input typically includes questions and answers, while a non-practice-test-type input may consist of educational materials that can be used to generate practice tests, such as research papers, textbook pages, lecture notes, presentation slides, and similar content.

If input data 312 is classified as a practice-test-type input, at operation 318 the identified questions are extracted. The question extraction process can be performed, for example, by extraction model 136. Additionally, in some cases, at operation 318, extraction model 136 can also extract answers if they are present within input data 312. Furthermore, at operation 318, after extracting questions, answers to these questions can be generated using the generative model 138, as previously described. Upon completion of operation 318, question-answer pairs become available. In some instances, these pairs may be used in subsequent operation 332 to generate similar new questions, or similar questions may be retrieved from the question-answer database 160 during operation 330, as detailed below.

Following operation 318, method 300 advances to operations 330 and 332, which can be executed in parallel. At operation 330, if the input data 312 is identified as non-practice-test-type input, concepts and definitions from the input data 312 are extracted. Vector embeddings are then generated based on these concepts and definitions, enabling a vector search within the question-answer database 160 to retrieve questions and answers that match the concepts and definitions found in input data 312. This search leverages a question reservoir 360 containing a question index 363, a question ID lookup 361 (which maps the question index 363 to the question identification (ID) used in the question metadata table), and a question metadata table 362. The metadata table is designed to store text corresponding to various questions and answers, along with associated attributes such as subject, grade level, and difficulty level. Furthermore, even if the input data 312 is identified as practice-test-type input at operation 318, additional questions and answers can still be retrieved at operation 330 based on the questions and/or answers extracted from the input data 312. This process may involve generating vectorized representations of the extracted questions and answers and performing a vector search within the question-answer database 160 to identify relevant additional questions and associated answers.

Question metadata table 362 refers to information and attributes associated with each question in a database, providing context and enabling efficient organization, retrieval, and filtering. Metadata helps models and algorithms make more informed decisions about which questions to include, how to rank them, and how to present them in a way that best suits the user's requirements. Examples of question metadata include topic or subject, which specifies the subject matter of the question, such as "Biology," "Physics," "Chemistry," or more granular topics like "Photosynthesis," "Newton's Laws," or "Chemical Reactions." Metadata may also include difficulty level, indicating the complexity of the question as "Beginner," "Intermediate," "Advanced," or a numerical difficulty score, enabling the system to tailor practice tests according to user proficiency. Question type is another metadata attribute that defines the format of the question, such as "Multiple Choice," "Short Answer," "True/False," "Fill-in-the-Blank," or "Essay," allowing the system to filter questions based on the preferred format or assessment style. Metadata can also include keywords or tags, which are descriptive keywords such as "energy," "forces," or "ecosystem" that help in searching for questions related to specific concepts and assist in semantic analysis for retrieving similar questions.

Additionally, concepts covered within the question metadata list the concepts or learning objectives addressed, such as "Newton's First Law of Motion" or "Energy Transfer in Ecosystems," enabling mapping to curriculum standards or specific learning goals. The metadata can also specify answer options and the correct answer, particularly for multiple-choice questions, where it includes the list of answer choices and the correct one, facilitating structural understanding and evaluation. Metadata may include the question's origin or source, describing the textbook, lecture, or source from which the question was derived, or indicating whether it was generated by a model or retrieved from a previous test. Historical performance data can be part of the metadata, showing how users previously performed on the question, such as average response time, percentage of correct responses, or frequency of selection. This data helps determine the difficulty level or identify questions that need revision. Associated explanations or hints can also be included, providing additional context or support for users who may struggle with the question.

If it is determined at operation 318, that input data 312 is a non-practice-test-type input, method 300 can proceed to operation 332, where generative model 138 is used to generate questions based on the various concepts identified within input data 312. Furthermore, even when input data 312 is determined to be a practice-test-type input, in some cases, at operation 332 additional questions can be generated based on the questions and/or answers extracted from input data 312.

Once questions are either retrieved or generated at operations 330 or 332, respectively, they are processed at operation 334, where the questions and answers are ranked using ranking model 144. This ranking operation prioritizes and orders the questions based on various criteria, such as relevance, quality, and semantic alignment with the original content, as previously explained. Following the ranking, method 300 proceeds to operation 336 for additional post-processing tasks, such as formatting and validation, removing duplicate questions, eliminating inaccurate answers, and applying moderation filters, such as adjusting language or tone. After post-processing, the validated and ranked questions are stored in Second Q Bank at operation 340 for subsequent use in the practice test. Method 300 then completes, ensuring that the final set of questions is accurately aligned with the input data and ready for presentation to the user.

Figure 4:
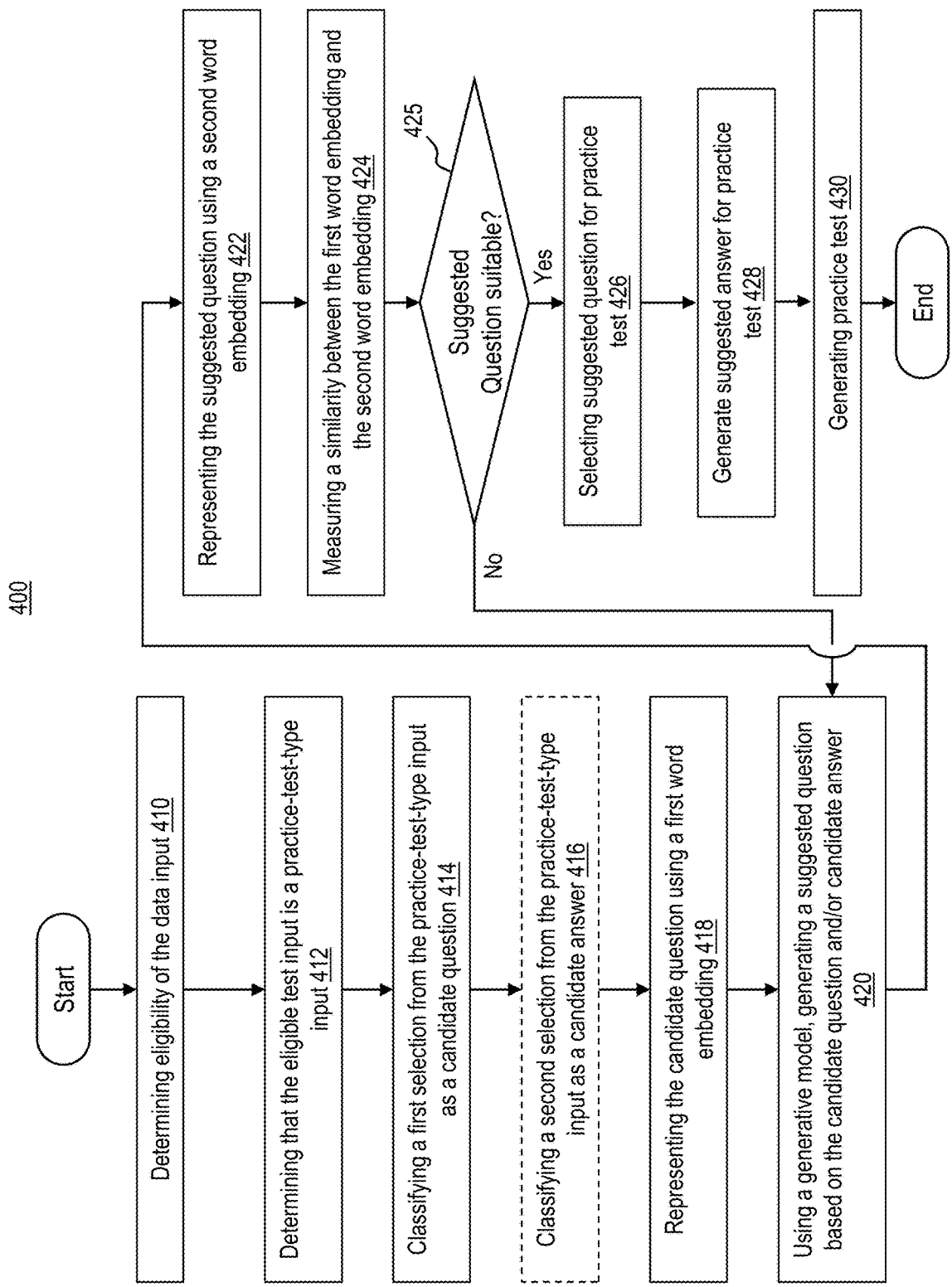
FIG. 4 presents a flowchart for generating a practice test in accordance with one or more embodiments.

FIG. 4 illustrates an example of method 400 for generating a practice test. In various embodiments, operations of method 400 are performed by application server computer 130, and more particularly by various models 133-138 of application server computer 130. Some operations can be optional, as indicated by boxes with dashed lines. At operation 410, method 400 begins by determining the eligibility of data input, which is obtained from a client computer using a server computer, such as application server computer 130 depicted in FIG. 1. To assess eligibility, application server computer 130 utilizes eligibility model 133, which identifies the language and subject associated with the data input. Eligibility model 133 then checks whether the identified language and subject match predefined sets of acceptable languages and subjects, thereby establishing whether the input data qualifies as eligible test input.

If the data input is determined to be eligible, method 400 advances to operation 412, where application server computer 130 classifies the input as a practice-test-type input using a data classification model, such as classification model 134. A practice-test-type input typically includes educational material formatted with questions and answers or is otherwise suitable for practice test generation. After determining the input type, method 400 proceeds to operation 414.

At operation 414, application server computer 130, using classification model 134, classifies a first selection from the practice-test-type input as a candidate question. After classifying a particular section of the practice-test-type input as a question, such a question can then be extracted, for example, by extraction model 136. Subsequently, at an optional operation 416, classification model 134 can be used to identify a second selection from the practice-test-type input as a candidate answer. The candidate question is then can be represented using a first word embedding at operation 418, which encodes the semantic and contextual meaning of the question text into a high-dimensional vector for further processing.

Additionally, during operation 416, the identified answer can be extracted using, for example, extraction model 136. In some cases, operation 416 may not be performed. For example, the extraction part of operation 416 may not be performed if practice-test-type input does not contain answers. Alternatively, even if practice-test-type input does contain such answers, such answers may not be extracted. Furthermore, operation 416 may be skipped entirely.

Next, at operation 420, application server computer 130 employs a generative model, such as generative model 138, to generate a suggested question based on the candidate question and, in some cases, a candidate answer. This suggested question is represented using a second word embedding at operation 422.

At an optional operation 424, application server computer 130 measures the similarity between the first word embedding (representing the candidate question) and the second word embedding (representing the suggested question).

At operation 424, method 400 calculates a similarity score based on the comparison of these embeddings. This similarity score is then evaluated at operation 425 to determine whether the suggested question is suitable as a practice test question. If the similarity score is above a predefined threshold (operation 425, Yes), application server computer 130 selects the suggested question as the practice test question at operation 426. If the similarity score does not meet the threshold (operation 425, No), method 400 may proceed to operation 420 at which a new suggested question is generated.

After completion of operation 426, method 400 proceeds to operation 428, at which a suggested answer is generated for the suggested question. In some cases, for generating suggested answer, generating model 138 can be used. In some cases, input for generating model 138 may include a suggested question, a candidate question, and a candidate answer to generate a suitable suggested answer.

After completion of operation 428, method 400 proceeds to operation 430 at which the practice test is generated. The practice test can be represented as one or more digital cards, where each digital card is configured to include a first graphical user element displaying the practice test question and a second graphical user element displaying the practice test answer. This format provides a user-friendly and organized way to present the practice test to the user, making it accessible and easy to navigate.

In various embodiments, the displayed practice test questions may not be the original questions extracted from the practice-test-type input. Instead, they can be newly generated by the generative model 138 based on the extracted questions, ensuring they are sufficiently distinct from the originals. Similarly, when answers are extracted from practice-test-type input, the displayed practice test answers can also be generated by the generative model 138 and associated with the newly generated questions. This approach is employed, for example, to create a practice test that is distinct from the one provided in the practice-test-type input.

Figure 5:
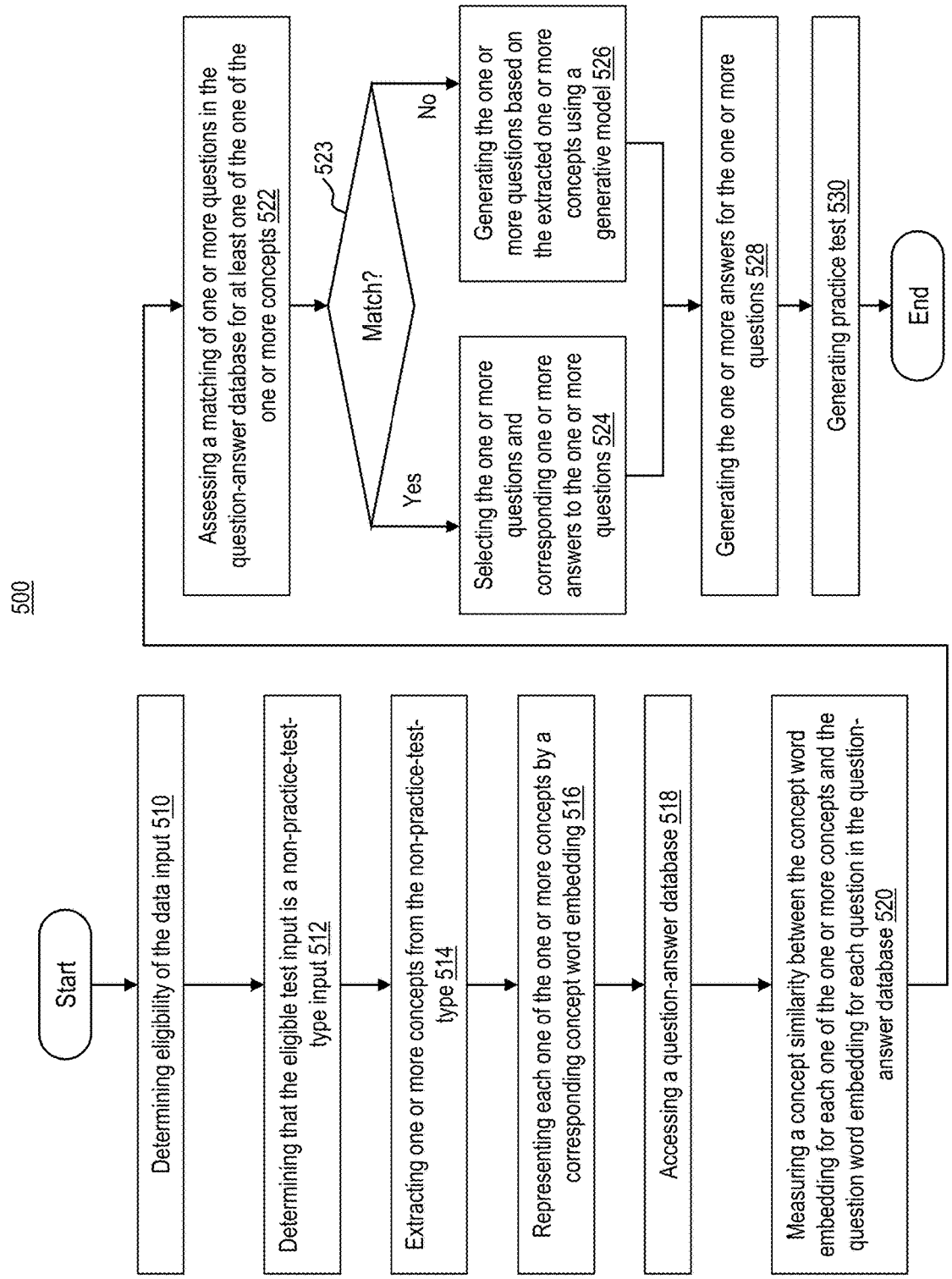
FIG. 5 illustrates another flowchart describing a process for generating practice tests in accordance with one or more embodiments.

FIG. 5 illustrates method 500, which is an example of generating practice tests based on non-practice-test-type input data. In various embodiments, the operations of method 500 are executed by application server computer 130, utilizing different models (e.g., models 133-138) within the application server computer 130. Method 500 begins at operation 510, where the server determines the eligibility of the data input. This operation may be similar to operation 410 of method 400, where the eligibility model 133 identifies the language and subject of the data input and verifies that it matches predefined sets of acceptable languages and subjects, qualifying the input as an eligible test input.

If the data input is determined to be eligible, method 500 moves to operation 512, where application server computer 130 determines that the eligible input is a non-practice-test-type input using classification model 134. A non-practice-test-type input refers to content that does not already include structured question-and-answer formats but can still be leveraged for practice test generation. Examples of such input include lecture notes, textbook pages, academic papers, or other educational materials.

At operation 514, application server computer 130 utilizes classification model 134 to identify one or more concepts from the non-practice-test-type input. After identifying such concepts, these concepts can then be extracted using, for example, extraction model 136. This extraction identifies concepts or topics within the data that are relevant for generating questions. At operation 516, each extracted concept is represented using a concept word embedding, which transforms the semantic meaning of the concepts into high-dimensional vectors for efficient comparison and further processing.

Subsequently, at operation 518, application server computer 130 accesses a question-answer database (e.g., database 160, as depicted in FIG. 1) that contains numerous records of questions and their corresponding answers. Each question in the database is represented by a corresponding question word embedding, which enables the system to measure the similarity between the concept word embeddings and the question word embeddings. At operation 520, the system measures the similarity between the concept word embeddings and the question word embeddings in the database to identify any overlap. To enable efficient searching, the database may employ a FAISS index for the questions and answers, using quantization and partitioning to support vector search. This allows for fast and scalable retrieval of the most relevant questions based on the similarity scores.

Method 500 then proceeds to operation 522, where the system evaluates whether there is a match between the extracted concepts and the questions in the database based on the similarity scores. If the similarity score for any question is above a selected threshold (operation 523, Yes), method 500 advances to operation 524, where the matched questions and their corresponding answers are selected for use in the practice test. If no matching questions are found (operation 523, No), method 500 transitions to operation 526, where a generative model (e.g., generative model 138) is used to generate new questions based on the extracted concepts. In some cases, generative model 138 may also generate corresponding answers for these newly created questions at operation 528. Alternatively, the system can search the question-answer database again after generating questions using generative model 138 to identify matching records in the database.

At operation 530, method 500 compiles and presents the generated practice test, organizing the selected or generated questions and answers into a coherent test format. The method then completes, having successfully generated a practice test that is contextually relevant to the original non-practice-test-type input data.

The computer-implemented methods described herein provide a framework for generating and validating questions and answers from practice-test-type input, as well as input containing concepts and definitions. A classification model can be used to identify candidate questions and answers through multiple inference stages. For instance, a second inference stage of the classification model can process a second selection from the input to identify candidate answers. These candidate answers are then evaluated using an embedding model that generates word embeddings for both the candidate and suggested answers. The similarity between these embeddings can be calculated, and a suggested answer is deemed suitable if its similarity score exceeds a predefined threshold. This ensures that generated answers are contextually relevant and aligned with the practice test's content.

The methods discussed herein also support processing multiple candidate questions and answers. The first selection may include a plurality of candidate questions, while the second selection may include multiple candidate answers. These selections can be incorporated into prompts for downstream processing, enabling a more comprehensive evaluation and refinement of the generated content.

In some cases, to prepare the input data for these operations, the method can employ a segmentation model that divides the input into logical sections. This segmentation process uses rule-based techniques to detect structural patterns, such as paragraph breaks, bullet points, or changes in indentation. Syntactic and semantic feature extraction techniques further enhance the segmentation by identifying logical boundaries between sections. Once segmented, an eligibility model determines the language and subject of each section, ensuring that only relevant portions of the input are analyzed further.

The classification model can be designed to handle diverse and ambiguous inputs. It may be implemented as a large language model trained on labeled datasets, an Information Maximizing Generative Adversarial Network (Info-GAN) trained on synthetic datasets, or a foundation model pre-trained on large-scale language corpora and fine-tuned for specific subjects. To manage ambiguous sections, the system employs uncertainty estimation techniques such as Monte Carlo Dropout or Bayesian Neural Networks, which flag sections with low confidence scores for additional review. Furthermore, the model is configured to detect contextual shifts between sections by analyzing linguistic features, improving the accuracy of question and answer identification.

The methods discussed herein use an embedding model to evaluate the relationships between candidate and suggested content, such as candidate and suggested questions or candidate and suggested answers. The embedding model generates multi-level embeddings that capture semantic relationships at the word, sentence, and paragraph levels. These embeddings are compared using similarity measures, such as cosine similarity, to assess their similarity. An attention model can enhance this process by assigning higher weights to contextually significant words or phrases, ensuring that semantic elements are prioritized in the similarity calculations.

Furthermore, to generate suggested questions and answers, the methods discussed herein can, in some embodiments, access a question-answer database containing pre-computed word embeddings for both. For suggested questions, the embeddings of candidate questions are compared to those in the database, with matches determined based on similarity scores exceeding a selected threshold. Similarly, candidate answers are represented as embeddings and compared to answer embeddings in the database to retrieve corresponding questions. This process ensures that the generated questions and answers are sufficiently novel but contextually related to the input data.

As described above, both segmentation and eligibility processes can be used to prepare a practice test. The segmentation model can be configured to identify logical sections using a variety of patterns, such as paragraph breaks, bullet points, or sentence structure variations, while the eligibility model evaluates the sections' language and subject. Together, these steps prepare the input for classification and embedding operations.

By integrating segmentation, classification, embedding, and attention-based similarity techniques, the methods provide a solution for generating practice test content. The methods described herein ensure that the generated questions and answers are not only relevant and novel but can also be generated for diverse input scenarios, including those containing ambiguous input text.

3. Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
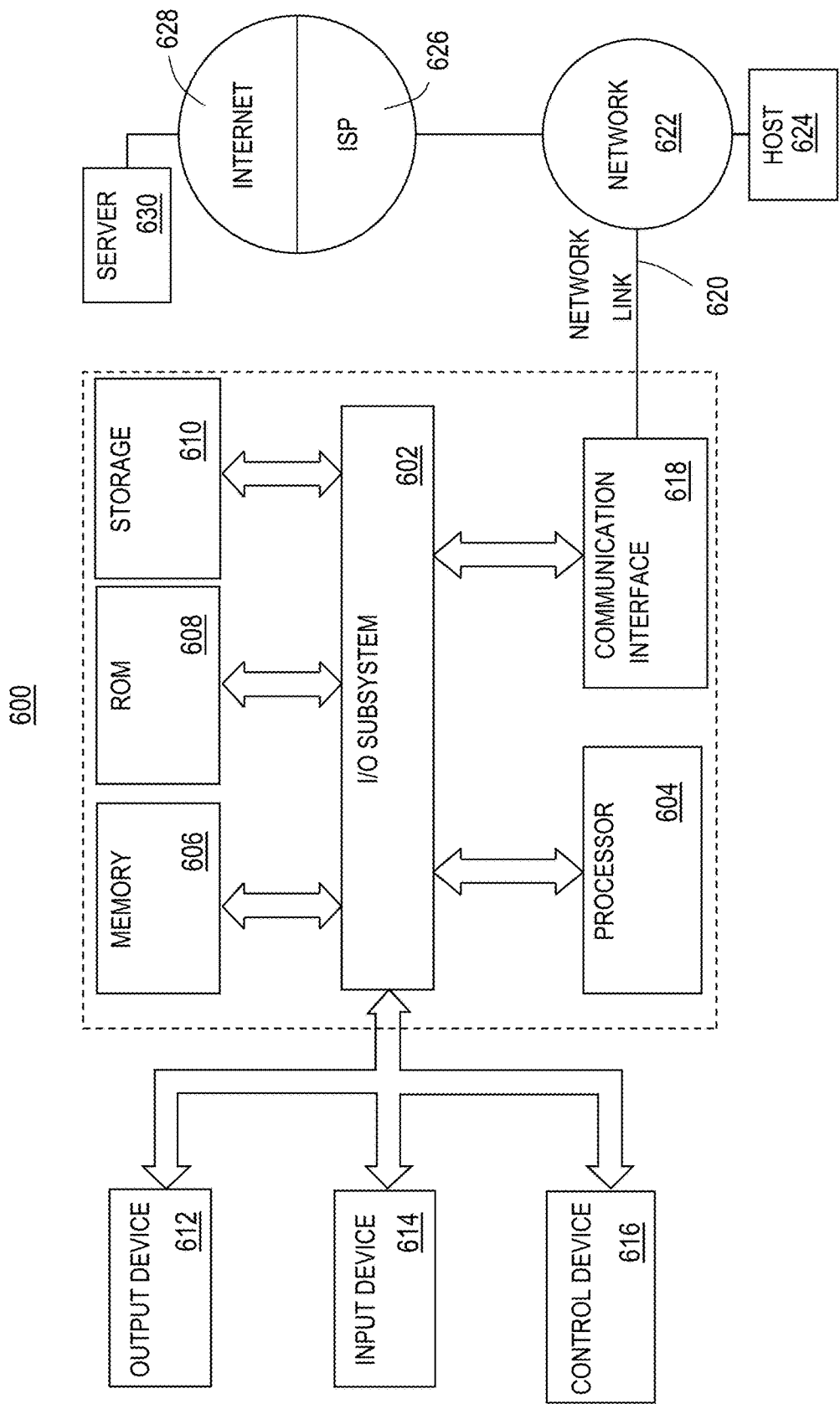
FIG. 6 illustrates an example computer system in accordance with one or more embodiments, which may be configured to implement the methods and processes described in FIG. 1, FIG. 2, FIG. 3, FIG. 4, and FIG. 5.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM), such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on an output device 612 such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host computer 624 or server computer 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to I/O subsystem 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server computer 630 broadly represents any computer, data center, virtual machine or virtual computing instance with or without a hypervisor, or computer executing a containerized program system such as DOCKER or KUBERNETES. Server computer 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server computer 630 may form elements of a distributed computing system that includes other computers, a processing cluster, server farm or other organization of computers that cooperate to perform tasks or execute applications or services. Server computer 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server computer 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    using a server computer, obtaining data input from a client computer;
    identifying a language and a subject associated with the data input;
    determining that the data input is an eligible test input based on the identified language being part of a predefined set of languages and the identified subject being part of a predefined set of subjects;
    determining that the eligible test input is a practice-test-type input using a classification model;
    executing a first inference stage of the classification model over a first selection from the practice-test-type input to generate a first prediction indicating that the first selection comprises a candidate question;
    transmitting to a generative model a first prompt comprising the first selection to output a suggested question;
    transmitting, to the generative model, a second prompt comprising the suggested question to output a suggested answer;
    executing an embedding model over the candidate question and the suggested question to output a first set of multi-level embeddings corresponding to the candidate question and a second set of multi-level embeddings corresponding to the suggested question, respectively, each set including one or more of a word-level embedding, a sentence-level embedding, or a paragraph-level embedding;
    selecting the suggested question as a practice test question based on an analysis of the first and second sets of multi-level embeddings;
    selecting the suggested answer as a practice test answer; and
    generating a practice test comprising a digital card, the digital card having a first graphical user element configured to display the practice test question and having a second graphical user element configured to display the practice test answer, wherein each of the classification model and the generative model comprises a trained machine-learning model.

2. The computer-implemented method of claim 1, further comprising:
    executing the embedding model over the candidate question to output a first word embedding corresponding to the candidate question;
    executing the embedding model over the suggested question to output a second word embedding corresponding to the suggested question;
    measuring a similarity between the first word embedding and the second word embedding; and
    assessing a suitability of the suggested question as the practice test question based on a similarity score being above a first selected threshold.

3. The computer-implemented method of claim 2, further comprising:
    executing a second inference stage of the classification model over a second selection from the practice-test-type input to generate a second prediction indicating that the second selection comprises a candidate answer;
    executing the embedding model over the candidate answer to output a third word embedding corresponding to the candidate answer;
    executing the embedding model over the suggested answer to output a fourth word embedding corresponding to the suggested answer;
    measuring a similarity between the third word embedding and the fourth word embedding; and
    assessing a suitability of the suggested answer as the practice test answer based on a similarity score being above a second selected threshold.

4. The computer-implemented method of claim 3, wherein the first selection comprises a plurality of candidate questions.

5. The computer-implemented method of claim 3, wherein the second selection comprises a plurality of candidate answers.

6. The computer-implemented method of claim 3, wherein the first prompt, the second prompt, or a combination thereof further comprises the second selection.

7. The computer-implemented method of claim 1, further comprising segmenting the data input into one or more sections using a segmentation model and determining an eligibility for each section from the one or more sections based on identified language and subject for each section using an eligibility model.

8. The computer-implemented method of claim 7, wherein the segmentation model is a rule-based model configured to extract text data from the data input and identify the one or more sections by detecting specific patterns within the text data, wherein the specific patterns include at least one of: beginning and end of paragraphs, beginning and end of lists, text separated by spaces, changes in indentation levels, presence of bullet points or numbered sequences, heading or subheading styles, line breaks or page breaks, quotation marks or block quote indicators, punctuation patterns such as colons or ellipses, variations in sentence length or structure, phrases, or enumerated answer options; and wherein the patterns are used to delimit boundaries between the one or more sections.

9. The computer-implemented method of claim 8, wherein the segmentation model is configured to utilize syntactic and semantic feature extraction techniques to identify logical boundaries between the one or more sections.

10. The computer-implemented method of claim 7, wherein the eligibility model is a large language model configured to determine the language and the subject of each section from the one or more sections.

11. The computer-implemented method of claim 1, wherein the classification model is a large language model trained on a labeled training dataset, the labeled training dataset comprising training text labeled with question-specific labels when corresponding to questions and labeled with answer-specific labels when corresponding to answers.

12. The computer-implemented method of claim 1, wherein the classification model is an Information Maximizing Generative Adversarial Network (Info-GAN) trained on a generated synthetic training dataset.

13. The computer-implemented method of claim 12, wherein the classification model is a foundation model pre-trained on a large-scale language corpus and further fine-tuned on a labeled training dataset, the labeled training dataset selected based on the identified subject of the practice-test-type input.

14. The computer-implemented method of claim 1, wherein the classification model is further configured to handle ambiguous sections for identifying questions and answers of the practice-test-type input by using uncertainty estimation techniques to quantify a confidence level of text classification model's predictions, wherein the uncertainty estimation techniques include at least one of Monte Carlo Dropout or Bayesian Neural Networks, and wherein the ambiguous sections with low confidence scores are flagged.

15. The computer-implemented method of claim 1, further comprising using the classification model to detect contextual shifts between sections for identifying questions and answers, wherein the contextual shifts are detected by analyzing changes in one or more linguistic features.

16. The computer-implemented method of claim 2, wherein the first word embedding comprises the first set of multi-level embeddings and the second word embedding comprises the second set of multi-level embeddings, each set including word-level embeddings for capturing an individual word meaning, sentence-level embeddings for capturing contextual meaning within a sentence, and paragraph-level embeddings for capturing contextual meaning across multiple sentences, and wherein the first and second sets of multi-level embeddings are used to compute the similarity by comparing embeddings at different levels of granularity to identify semantic relationships between the candidate question and the suggested question.

17. The computer-implemented method of claim 16, wherein the similarity is determined using a cosine similarity.

18. The computer-implemented method of claim 2, further comprising using an attention model to weigh an importance of individual words or phrases within the candidate question and the suggested question, wherein the attention model is configured to assign higher weights to the individual words or the phrases that are contextually significant, and wherein the similarity between the candidate question and the suggested question is calculated based on attention-weighted individual words or phrases within the candidate question and attention-weighted individual words or phrases within the suggested question.

19. The computer-implemented method of claim 3, wherein generating the suggested question comprises:
   accessing a question-answer database containing a plurality of records corresponding to questions having associated answers, wherein each question in the question-answer database includes an associated question word embedding;
   measuring a question similarity between the first word embedding and the question word embedding for each question;
   determining a matching question in the question-answer database for the question, based on the measured question similarity being above a third selected threshold; and
   selecting the matching question as the suggested question.

20. The computer-implemented method of claim 3, wherein generating the suggested question comprises:
   accessing a question-answer database containing a plurality of records corresponding to questions having associated answers, wherein each answer in the question-answer database includes an associated answer word embedding;
   measuring an answer similarity between the third word embedding and the answer word embedding for each question;
   determining a matching answer in the question-answer database, based on the measured answer similarity being above a third selected threshold; and
   selecting a question paired with the matching answer as the suggested question.

* * * * *